(12) United States Patent
Tse et al.

(10) Patent No.: US 11,317,570 B2
(45) Date of Patent: May 3, 2022

(54) PEANUT MATURITY GRADING SYSTEMS AND METHODS

(71) Applicant: University of Georgia Research Foundation, Inc., Athens, GA (US)

(72) Inventors: Tsz Ho Tse, Lawrenceville, GA (US); Brian Boland, Athens, GA (US); Donald Leo, Athens, GA (US); Kyle Johnsen, Athens, GA (US); Sahil Patel, Athens, GA (US); Zhuo Zhao, Athens, GA (US)

(73) Assignee: University of Georgia Research Foundation, Inc., Athens, GA (US)

( * ) Notice: Subject to any disclaimer, the term of this patent is extended or adjusted under 35 U.S.C. 154(b) by 308 days.

(21) Appl. No.: 16/561,650

(22) Filed: Sep. 5, 2019

(65) Prior Publication Data

US 2020/0068816 A1    Mar. 5, 2020

Related U.S. Application Data

(60) Provisional application No. 62/727,247, filed on Sep. 5, 2018.

(51) Int. Cl.
| | |
|---|---|
| *A01G 22/40* | (2018.01) |
| *B07C 5/342* | (2006.01) |
| *G06K 7/10* | (2006.01) |
| *G06K 7/00* | (2006.01) |
| *G06K 9/00* | (2022.01) |
| *G06V 10/44* | (2022.01) |

(52) U.S. Cl.
CPC .............. *A01G 22/40* (2018.02); *B07C 5/342* (2013.01); *G06K 7/00* (2013.01); *G06K 7/10722* (2013.01); *G06K 9/00* (2013.01); *G06V 10/443* (2022.01); *A23V 2002/00* (2013.01)

(58) Field of Classification Search
USPC .............. 382/110; 356/402; 348/89; 209/577
See application file for complete search history.

(56) References Cited

U.S. PATENT DOCUMENTS

| 5,488,479 A * | 1/1996 | Williams .............. B07C 5/3425 |
| | | 356/402 |
| 9,866,768 B1 * | 1/2018 | O'Shaughnessy ..... H04N 5/332 |
| 2013/0044919 A1 * | 2/2013 | Purcell ................... G01N 21/84 |
| | | 382/110 |
| 2020/0398316 A1 * | 12/2020 | Tse ......................... A01G 22/40 |

OTHER PUBLICATIONS

Bindlish et al, "Assessment of Peanut Pod Maturity" 2017 IEEE, 2017 Winter COnference on Applications of Computer Vision, pp. 688-696 (Year: 2017).*

(Continued)

*Primary Examiner* — Kathleen Y Dulaney
(74) *Attorney, Agent, or Firm* — Thomas | Horstemeyer, LLP

(57) ABSTRACT

The present disclosure provides peanut maturity grading systems and methods for quickly, efficiently, and objectively determining a peanut maturity grade for a crop of peanuts and determining an optimal harvest time for the crop. Embodiments of systems and methods of the present disclosure can be performed in the field or field-side and do not require assistance of a trained peanut grading specialist.

20 Claims, 19 Drawing Sheets
(16 of 19 Drawing Sheet(s) Filed in Color)

(56) References Cited

OTHER PUBLICATIONS

Andrade et al., Intercepted radiation at flowering and kernel number in maize, vol. 92, No. 1, pp. 92-97, 2000.
Bindlish etal., Assessment of peanut pod maturity. Proc. IEEE Winter Conf. on Applications of Computer Vision (WACV) (pp. 688-696). Piscataway, NJ: IEEE. https://doi.org/10.1109/WACV.2017.82, 2017.
Boldor et al., Computer-Assisted Color Classification of Peanut Pods. Peanut Science, 29(1), 41-46. doi:10.3146/pnut.29.1.0008, 2002.
Cober et al., Photoperiod and Temperature Responses in Early-Maturing, Near-Isogenic Soybean Lines, Crop Sci. 41:721-727, 2001.
Colvin et al., Development of a Digital Analysis System to Evaluate Peanut Maturity, Peanut Science, 41:8-16, 2014.
Daigle et al., Peanut Hull Flavonoids: Their Relationship with Peanut Maturity, J. Agric. Food Chem., 36, 1179-1181, 1988.
Dietzgen, Elimination of Aflatoxin Contamination in Peanut, Canberra, ACIAR Proceedings No. 89, p. 98.
Dufault, Determining Heat Unit Requirements for Broccoli Harvest in Coastal South Carolina, J. Amer. Soc. Hort. Sci., 122(2):169-174, 1997.
Ghate et al., Maturity Detection in Peanuts (*Arachis hypogaea* L.) Using Machine Vision, American Society of Agricultural Engineers, vol. 36(6):1941-1947, 1993.
Holaday et al., A Method for Estimating Peanut Maturity, Journal of Food Science, vol. 44, No. 1, 254-256, 1979.
Johnson et al., Evaluation of the Arginine Maturity Index (AMI) Method of Maturity Estimation for Virginia Type Peanuts1, Peanut Science, p. 32-36.
Lamb et al., Impact of Sprinkler Irrigation Amount and Rotation on Peanut Yield, Peanut Science, 31:108-113, 2004.
Liang et al., Estimation of Peanut Maturity Using Color Image Analysis, Annual International Meeting, p. 2-16, 2018.
Lopez et al., Genetic Factors Influencing High Oleic Acid Content in Spanish Market-Type Peanut Cultivars, Published in Crop Sci. 41:51-56, 2001.
Miller et al., Internal Color of Spanish Peanut Hulls as an Index of Kernel Maturity, Journal of Food Science, vol. 36, p. 669-670, 1971.
Mozingo et al., The Influence of Planting and Digging Dates on Yield, Value, and Grade of Four Virginia-type Peanut Cultivars1, Peanut Science, 18:55-62, 1991.
Narendra et al., Cashew Kernels Classification Using Colour Features, IJMI, vol. 3, Issue 2, p. 52-57, 2011.
National Peanut Board, Peanut Country, U.S.A., 2018.
NCSE, Maturity Profile Board for Virginia-Type Peanuts.
NeSmith et al., Variation in the Onset of Flowering of Summer Squash as a Function of Days and Heat Units, J. Amer. Soc. Hort. Sci. 119(2):249-252, 1994.
Pattee et al., Composition Changes of Peanut Fruit Parts During Maturation1, Peanut Science, p. 57-62.
Pattee et al., The Seed-Hull Weight Ratio as an Index of Peanut Maturity 1,2, Peanut Science, vol. 4, No. 2, p. 47-50, 1977.
Perry et al., Heat units to predict tomato harvest in the southeast USA, Agricultural and Forest Meteorology 84, 249-254, 1997.
Rowland et al., Determination of Maturity and Degree Day Indices and their Success in Predicting Peanut Maturity1, Peanut Science, 33:125-136, 2006.
Rucker et al., Sorting Peanuts by Pod Density to Improve Quality and Kernel Maturity Distribution and to Reduce Aflatoxin, Peanut Science, 21:147-152, 1994.
Sanders et al., Oil Characteristics of Peanut Fruit Separated by a Nondestructive Maturity Classification Method, Peanut Science, 9, 20-23, 1982.
Sanders et al., Peanut Maturity Method Evaluations. I. Southeast, Peanut Science, 7, 78-82, 1980.
Shahin et al., Fuzzy Logic Model for Predicting Peanut Maturity, American Society of Agricultural Engineers, vol. 43(2):483-490, 2000.
Srinivasan et al., Three decades of managing Tomato spotted wilt virus in peanut in southeastern United States,Virus Research, 241, 203-212, 2017.
Turner et al., Factors Relating to Peanut Yield Increases After Seed Treatment with Bacillus subtilis, Plant Disease, p. 347-353, 1991.
USDA, Crop Production Summary, 2018.
USDA, Oilseeds: World Markets and Trade, 2018.
USDA, Shelled Walnuts Grades and Standards, 2017.
Viator et al., Predicting Cotton Boll Maturation Period Using Degree Days and Other Climatic Factors, Agron. J. 97:494-499, 2005.
Williams et al., A Non-Destructive Method for Determining Peanut Pod Maturity, Peanut Science, 8, 134-141, 1981.
Yen et al., Relationship between Antioxidant Activity and Maturity of Peanut Hulls, J. Agrie. Food Chem., 41. 67-70, 1993.
Young et al., Harvesting, Curing and Energy Utilization, Peanut Science and Technology, p. 459-485.

* cited by examiner

Examples of prices of 4 types of peanuts in dashboard view

| Name | Date | Latitude | Longitude | NumberofPeanuts | SelectedDiggingDays | OptimizedDaysBe... | Acres | Type | Weather | Water |
|---|---|---|---|---|---|---|---|---|---|---|
| Pilot User1 | Aug 30, 2018 12:53 PM | 33.93387 | 80.37392 | 30 | 30 | 27.6 | 10 | Georgia-07W | Partly Cloudy | 60% |

PEANUT MATURITY GRADING SYSTEMS AND METHODS

CROSS-REFERENCE TO RELATED APPLICATIONS

This application claims priority to, and the benefit of, U.S. provisional application entitled "PEANUT MATURITY GRADING SYSTEMS AND METHODS" having Ser. 62/727,247 filed Sep. 5, 2018, which is incorporated by reference in its entirety.

BACKGROUND

The state of Georgia accounts for nearly half of the national acreage for peanut production in the United States, making it the number one peanut-producing state in the nation. According to the most recent Peanut Update from UGA Extension, there were between 700,000 and 800,000 acres of peanut crops in the state in 2016 with a gross dollar value per acre of between US $817 and $936. Determining optimal harvest times for greatest yield and value is a time consuming process typically done by a handful of trained county officials who service a large area of peanut growers. The peanut farmers often have to bring peanut samples to a county office for evaluation, resulting in loss of valuable field time. The process is often based on the personal experience of the evaluator and is thus subjective. The evaluation, results, and data is not typically stored for later reference.

SUMMARY

In various aspects, peanut grading systems and methods are provided that overcome one or more of the aforementioned deficiencies. The systems and methods can quickly, accurately, and objectively assess peanut maturity as well as project other information, such as optimal harvest dates and peanut prices, based on the assessed peanut maturity.

The present disclosure provides systems, devices, and methods for peanut maturity grading that can be performed in the field and do not require specially trained professionals. In aspects, the system includes a peanut maturity grading system (PMGS) including a peanut grading calibration card comprising an array of peanut placement markers and at least one color gradient calibration bar, the peanut grading calibration card configured for placement of a plurality of sample peanuts on the markers of the peanut placement array; a camera configured to capture one or more images of the peanut grading calibration card; at least one computing device being in data communication with the camera; and a peanut maturation determination application (PMDA) executable on the at least one computing device. When executed, the PMDA causes the at least one computing device to at least: receive the one or more images from the one or more cameras; detect the plurality of peanuts from the one or more images; automatically calibrate and adjust for lighting effects using the color gradient calibration bar; analyze the image and independently assign a peanut maturity grade for each of the plurality of peanuts from the one or more images based on at least the type of peanut and the color of the peanut as compared to the color gradient calibration bar; determine an optimal dig time for each of the plurality of peanuts in the one or more images based on the peanut maturity grade; and calculate, based on the optimal dig times for all of the peanuts detected on the peanut grading calibration card, an optimal harvest time for a crop of peanuts from which the sample peanuts were taken.

The present disclosure also includes, in various embodiments, methods for grading peanut maturity. In embodiments, such methods include using the PMGS of the present disclosure. In embodiments, such methods include at least the following steps: capturing, via a camera system of a peanut maturity grading system (PMGS), one or more images of a plurality of sample peanuts from a peanut crop, the sample peanuts arranged on calibration card comprising an array of peanut placement markers and at least one color gradient calibration bar, wherein the peanuts are arranged on the calibration card such that each peanut is on one of the peanut placement markers; analyzing, via at least one computing device of the PMGS, the one or more images captured by the camera of the PMGS, wherein the analyzing includes automatically calibrating and adjusting for lighting effects using the color gradient calibration bar, automatically detecting the plurality of peanuts, automatically assign a peanut maturity grade to each peanut based on at least the type of peanut and the color of the peanut as compared to the color gradient calibration bar, and automatically determining an optimal dig time for each peanut based at least on the peanut maturity grade for that peanut; and generating, via the at least one computing device of the PMGS, a report providing optimized harvest times for the peanut crop based at least on the optimal dig times for the plurality of sample peanuts detected and analyzed.

In aspects, the present disclosure also includes PMGSs that use a dynamic peanut grading calibration card. In embodiments, a PMGS of the present disclosure can include: a dynamic peanut grading calibration card comprising four corner alignment and calibration patches, wherein at least 2 of the corner markers comprise embedded color calibration information, the dynamic peanut grading calibration card configured for placement of a plurality of sample peanuts on the card and for dynamic alignment of the image; a camera configured to capture one or more images of the peanut grading calibration card; at least one computing device being in data communication with the camera; and a peanut maturation determination application (PMDA) executable on the at least one computing device. When executed, the PMDA causes the at least one computing device to at least: receive the one or more images from the one or more cameras; automatically align the image in real-time; detect the plurality of peanuts from the one or more images; automatically calibrate and adjust for lighting effects using the embedded color calibration information; analyze the image and independently assign a peanut maturity grade for each of the plurality of peanuts from the one or more images based on at least the type of peanut and the color of the peanut as compared to the color calibration information; determine an optimal dig time for each of the plurality of peanuts in the one or more images based on the peanut maturity grade; and calculate, based on the optimal dig times for all of the peanuts detected on the peanut grading calibration card, an optimal harvest time for a crop of peanuts from which the sample peanuts were taken.

The present disclosure also includes, in various embodiments, methods for grading peanut maturity using the PMGS of the present disclosure described above having the dynamic peanut grading calibration card. Such methods include at least the following steps: capturing, with the camera of the PMGS, one or more images of a plurality of sample peanuts from a peanut crop placed on the dynamic peanut grading calibration card; analyzing, via at least one computing device of the PMGS, the one or more images captured by the camera of the PMGS, wherein the analyzing includes calibrating and adjusting for lighting effects using the color gradient calibration bar, detecting the plurality of peanuts, assign a peanut maturity grade to each peanut based on at least the type of peanut and the color of the peanut as compared to the color gradient calibration bar, and determining an optimal dig time for each peanut based at least on the peanut maturity grade for that peanut; and generating, via the at least one computing device of the PMGS, a report providing optimized harvest times for the peanut crop based at least on the optimal dig times for the plurality of sample peanuts detected and analyzed Other systems, methods, devices, features, and advantages of the devices and methods will be or become apparent to one with skill in the art upon examination of the following drawings and detailed description. It is intended that all such additional systems, methods, devices, features, and advantages be included within this description, be within the scope of the present disclosure, and be protected by the accompanying claims.

BRIEF DESCRIPTION OF THE DRAWINGS

Many aspects of the present disclosure can be better understood with reference to the following drawings. The patent or application file contains at least one drawing executed in color. Copies of this patent or patent application with color drawing(s) will be provided by the Office upon request and payment of the necessary fee The components in the drawings are not necessarily to scale, with emphasis instead being placed upon clearly illustrating the principles of the disclosure. Moreover, in the drawings, like reference numerals designate corresponding parts throughout the several views.

FIG. 6A is a digital image depicting an embodiment of the card, and FIG. 6B is an image depicting sample peanuts arranged on the embodiment of the peanut grading calibration card from FIG. 6A.

FIG. 7A is a digital image depicting an embodiment of a 3D peanut grading calibration card of the present disclosure featuring well-shaped peanut placement markers, and FIG. 7B is a digital image depicting sample peanuts arranged in the wells of the embodiment of the 3D peanut grading calibration card of FIG. 7A.

FIGS. 8, 9, and 12 illustrate use of alignment tools. FIG. 10 illustrates a user interface showing application of the color gradient bar to re-calibrate color identification based on lighting effects, and FIG. 11 illustrates color grading according to the color gradient bar.

DETAILED DESCRIPTION

Figure 1:
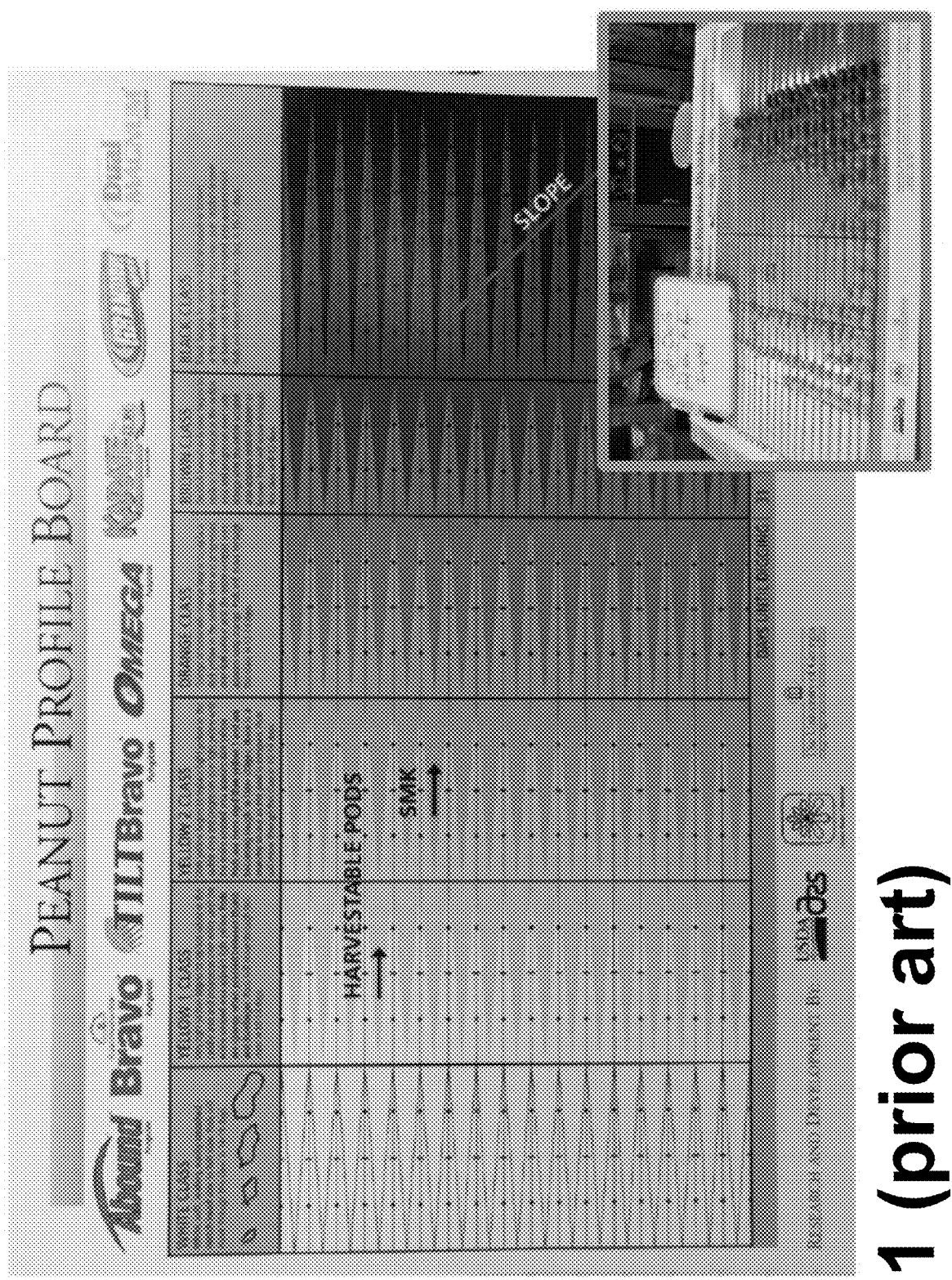
FIG. 1 is an example of a known method of manual peanut maturation grading using a peanut profile board with color grading and the hull scrape method.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure and to be encompassed by the claims herein.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant specification should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Embodiments of the present disclosure will employ, unless otherwise indicated, techniques of agriculture, botany, computer science, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Although any methods and materials similar or equivalent to those described herein can also be used in the practice or testing of the present disclosure, the preferred methods and materials are now described. Functions or constructions well-known in the art may not be described in detail for brevity and/or clarity.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

In this disclosure, "consisting essentially of" or "consists essentially" or the like, when applied to methods and compositions encompassed by the present disclosure refers to compositions like those disclosed herein, but which may contain additional structural groups, composition components or method steps (or analogs or derivatives thereof as discussed above). Such additional structural groups, composition components or method steps, etc., however, do not materially affect the basic and novel characteristic(s) of the compositions or methods, compared to those of the corresponding compositions or methods disclosed herein. "Consisting essentially of" or "consists essentially" or the like, when applied to methods and compositions encompassed by the present disclosure have the meaning ascribed in U.S. Patent law and the term is open-ended, allowing for the presence of more than that which is recited so long as basic or novel characteristics of that which is recited is not changed by the presence of more than that which is recited, but excludes prior art embodiments.

As used herein, "about," "approximately," "substantially," and the like, when used in connection with a numerical variable, can generally refers to the value of the variable and to all values of the variable that are within the experimental error (e.g., within the 95% confidence interval for the mean) or within +/−10% of the indicated value, whichever is greater. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the terms "optional" or "optionally" indicates that the subsequently described event or circumstance can or cannot occur, and that the description includes instances where said event or circumstance occurs and instances where it does not.

Description

In various aspects, the present disclosure relates to various systems and methods for facilitating the determination and grading of the maturity of crops of peanuts to help estimate preferred harvest times for optimizing crop yields and profits. The systems and methods of the present disclosure provide advantages over traditional grading methods which cannot be done in the field and require significant input of time and analysis by one or more individuals (farmer, county official, etc.). The systems and methods of the present disclosure provide a mobile and more automated approach that allows for quick and efficient peanut maturity grading and harvest time estimation in the field.

The present disclosure provides an easy-to-use tool for peanut growers that helps them optimize the date of harvest and maximize crop value. Research by Kvien (http://www/gapeanuts.com/growerinfo/research/2016reports/2016_gperesearch_kvien_hullscra pemethod.pdf) has demonstrated that optimizing the harvest date yields a measurable increase in crop value; likewise, harvesting too early results in a significant drop in the peanut grade and a drop in the crop value per acre. The currently employed method for determining peanut maturity and prospective harvest dates is called the hull scrape method, which is performed manually by a trained individual. A simple, portable, smartphone app could reduce the subjectivity associated with the hull scrape method, increase accuracy of color determination, facilitate the use of additional data, and improve the choice of harvest date, thus increasing crop value.

The hull scrape method is commonly used to assess the maturity of peanuts to determine optimum harvesting dates. In this method, illustrated in FIG. 1, growers typically use a color chart to compare the color of peanuts to standard colors to estimate the number of days until harvest. Formal assessment using the hull scrape method is usually done by a trained county professional and requires the farmer to take peanut samples to a county office for evaluation, often waiting in long lines with other peanut farmers as harvest season approaches. Such an assessment method also necessarily involves a certain element of subjectivity, which can lead to inconsistency from year to year or farmer to farmer. The present disclosure provides a field-portable, smartphone-based application that quickly, accurately, and objectively assesses the peanut color, estimates the optimal harvest date, and assesses the financial impact associated with the choice of harvest date. Such a product could reduce assessment time, significantly improve the accuracy determination of peanut maturity, and increase the crop value to the grower.

According to various embodiments of the present disclosure, a user (e.g., farmer, farm worker, crop scientist, etc.) of the system/methods of the present disclosure can easily and efficiently determine the maturity of multiple peanut crops and estimate the optimal harvest time for the crops as well as obtain valuable projected yield and financial data. According to various embodiments of the present disclosure, a trained deep-learning convolutional neural network (DL-CNN) can be used to distinguish, identify, and analyze peanut color and maturity using images obtained from a camera and can also calculate and determine additional output such as optimized dig dates for sampled peanuts and optimized harvest dates for the crop. The identification and color grading of sampled peanuts and other entered data can be transmitted to a remote database for further analysis and calculation of an optimized harvest date for a sampled peanut crop as well as projected crop yield and financial data. In various embodiments, data (both data obtained from peanut images on a user computing device, additional user-provided/input data, and additional data available from remote databases) can be transmitted via a network to a remote mapping program in real time.

Figure 2:
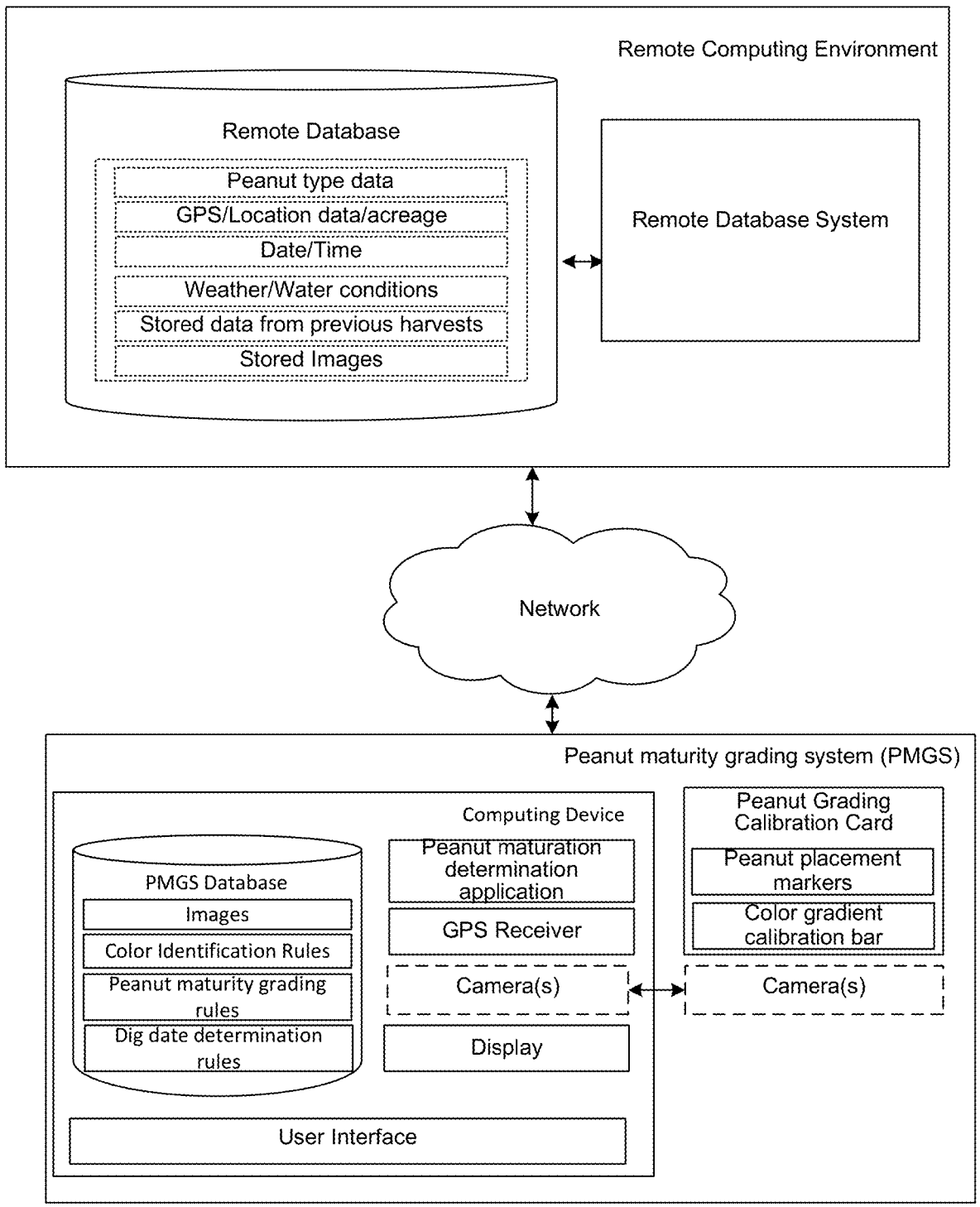
FIG. 2 is a schematic block diagram of a networked environment according to various embodiments of the present disclosure.

Turning to FIG. 2, shown is an example of a networked environment associated with an automated peanut maturity grading system (PMGS) according to various embodiments of the present disclosure. The networked environment includes a remote computing environment and a peanut maturity grading system (PMGS) in data communication via a network. As shown in FIG. 2, the PMGS includes a peanut grading calibration card, one or more cameras, at least one computing device and a peanut maturation determination application (PMDA) executable on the at least one computing device. The network includes, for example, the Internet, intranets, extranets, wide area networks (WANs), local area networks (LANs), wired networks, wireless networks, cable networks, satellite networks, or other suitable networks, etc., or any combination of two or more such networks.

The remote computing environment may comprise, for example, a computing device or any other system providing computing capability. Alternatively, the remote computing environment may employ a plurality of computing devices that may be arranged, for example, in one or more server banks or computer banks or other arrangements. Such computing devices may be located in a single installation or may be distributed among many different geographical locations. For example, the remote computing environment may include a number of computing devices that together comprise a hosted computing resource, a grid computing resource, and/or any other distributed computing arrangement. In some cases, the remote computing environment may correspond to an elastic computing resource where the allotted capacity of processing, network, storage, or other computing-related resources varies over time.

Various applications and/or other functionality may be executed in the remote computing environment according to various embodiments. Also, various data is stored in the remote database that is accessible to the remote computing environment. The remote data store may be representative of a plurality of data stores as can be appreciated. The data stored in the remote database, for example, is associated with the collection of peanut identification and grading information obtained by the PMGS. The data stored in the remote database (e.g. web or cloud database) can also include other data entered by a user (specific peanut type, crop location, water conditions, etc.), generally accessible data (e.g., GPS data, weather conditions, historical data, etc.). The data stored in the remote database can further be associated with the operation of the various applications and/or functional entities described below.

The components executed on the remote computing environment, for example, include the remote database system, and other applications, services, processes, systems, engines, or functionality not discussed in detail herein. The remote database system is executed to receive identification data from the PMGS and store it in the remote database. According to some embodiments, the remote database system can further be executed to train, retrain, and/or refine machine learning models using the various captured images. The remote database system can further be executed to retrieve data from the remote data store and transmit to additional computing devices for review. The data stored in the remote database can be used to determine optimized harvest dates for specific crops and ultimately projected crop yield data and even financial data (e.g., profit and loss data, projected peanut prices, etc.).

The data in the data store includes, for example, peanut data and potentially other data. Peanut data includes information on type of peanut crop, location data (e.g., GPS location, acreage, etc.), date/time, weather and/or water conditions, stored data from previous harvests, images, and/or other peanut data as applicable. In embodiments, location information corresponds to the exact latitude and longitude where a specific peanut crop resides. For this purpose, the PMGS may include a global positioning system (GPS) receiver and/or other positioning device. When activated the PMGS GPS receiver can determine the location of the crops. This information can then be transmitted to the remote database (in real-time or near real-time) for storage and further reference as can be appreciated.

Date/time information includes the date/time associated with the sampling of peanuts from a crop to be analyzed. The peanut type data corresponds to the species/variety of peanut plant and any other information specific to the peanut plant. The weather conditions can correspond to the historical weather conditions in the crop location during the growing season, or the predicted weather through the projected harvest dates. Water conditions can correspond to the watering/irrigation schedule used for the crops during the growing season. Stored data from previous harvests can include various information from previous harvests, such as crop yield, weather data from previous years, peanut maturity grading information from previous harvests, etc. The stored images may include those associated peanut color grading, maturity grading, as well as historical images and current images for analysis. Images can be used in retraining and/or refining the machine learning models implemented by the PMGS computing device and/or any other computing device as can be appreciated.

Figure 7A:
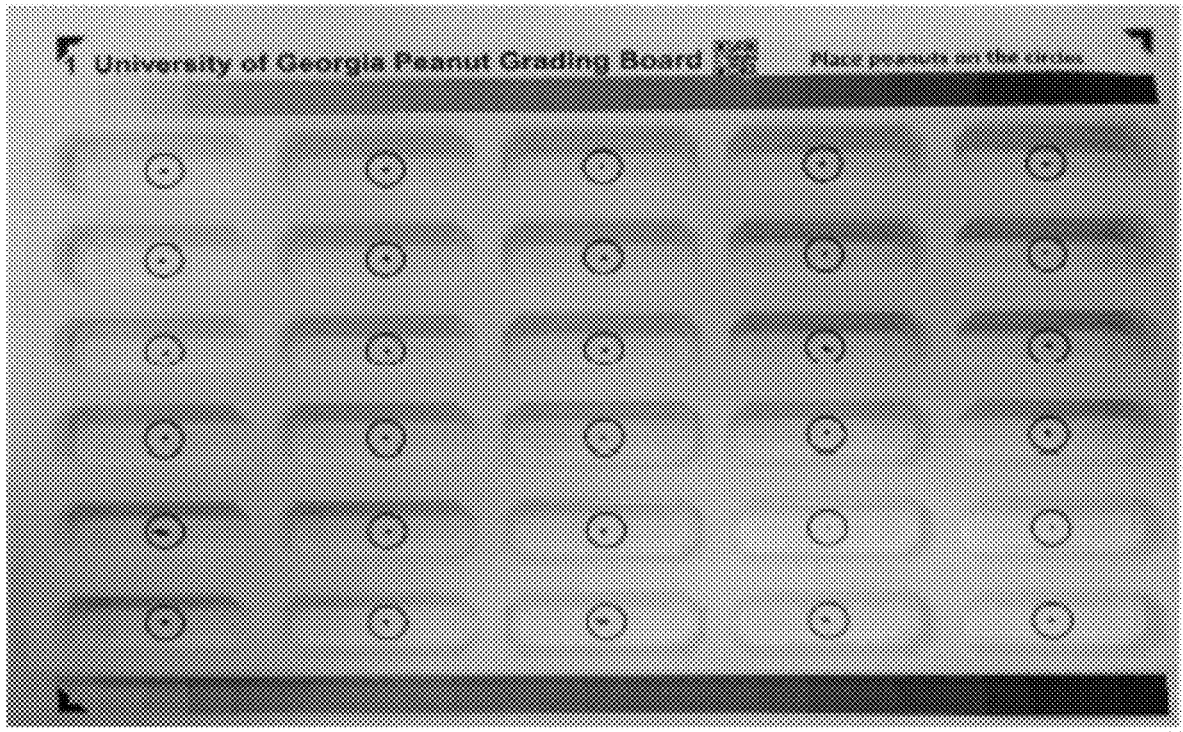
FIGS. 7A-7B illustrate an embodiment of a 3D peanut grading calibration card of the present disclosure with and without peanuts.
Figure 7B:
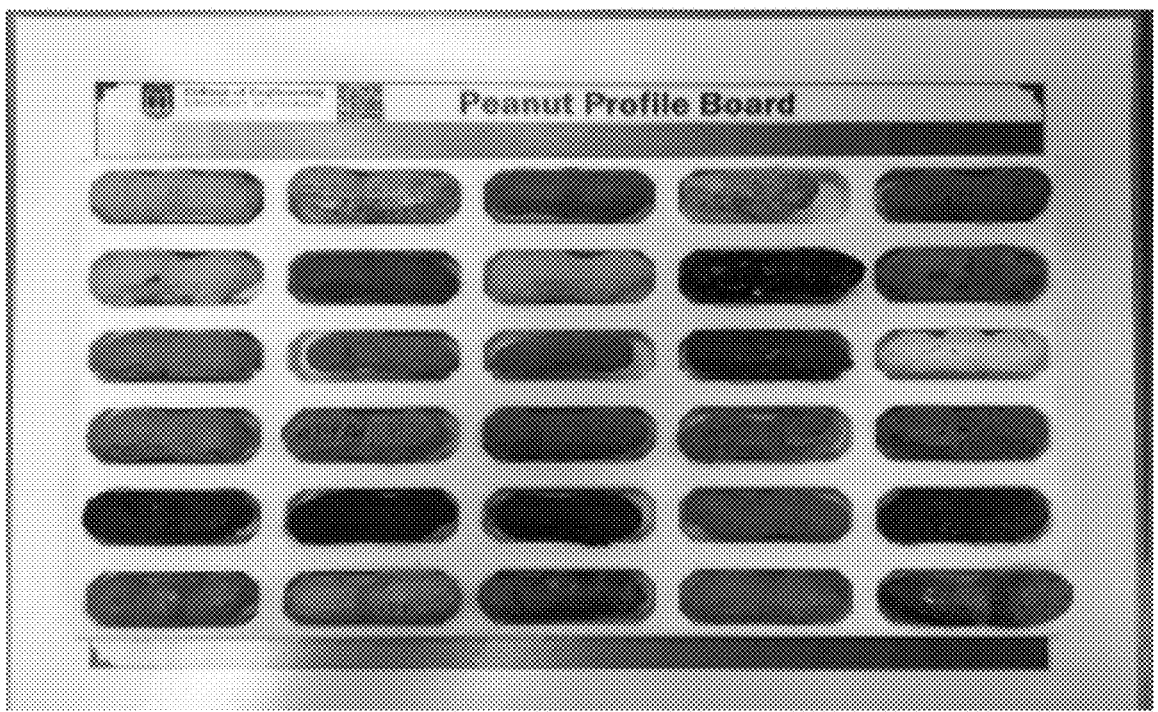

The PMGS includes at least a peanut grading calibration card, such as illustrated in FIGS. 6A-6B and FIGS. 7A and 7B. In embodiments, the peanut grading calibration card includes an array of peanut placement markers to assist a user in placement of sample peanuts (e.g., peanuts sampled from a crop for maturity analysis) on the calibration card. In an embodiment illustrated in FIG. 6A, the card is a flat substrate and the peanut placement markers can include an arrangement of markings (circles are illustrated, but the markings could be dots, squares, stars, any other symbol or marking to designate placement) to generally indicate the location for placement of a peanut on the marking on the card. However, in other embodiments, such as illustrated in FIG. 7A, the peanut placement card and/or markers may include a three dimensional shape, or depression to accommodate all or part of the peanut (e.g., an elongated well formed in the card in which a peanut can be placed as shown in FIG. 7B). This "well" can be altered in shape to allow for curvature that best fits the peanut type being sampled, so as to allow them to settle into the center of each slot in their proper alignment. This 3D card/board can have various configurations, an embodiment of which is shown in FIGS. 7A and 7B, and different varieties possess various advantages and disadvantages. In embodiments of a 3D peanut grading calibration card, the card is a three dimensional substrate and the peanut placement markers are elongated wells configured to receive a peanut such that peanuts can be placed in the wells. For example, a well with through-holes can allow smaller peanuts to be filtered out, keeping only those of the desired minimum size. In another embodiment, the peanut placement card can be a flat or 3D substrate having through-holes for placement of the peanuts, where the through-holes are shaped to hold the peanuts, but peanuts that are too small can be filtered out. In embodiments a second peanut placement card can be used to interface with the first peanut placement card to allow for easy "flipping" of the peanuts, so that the other side of the peanuts can also be analyzed without having to flip each peanut individually. An advantage to the systems of the present disclosure, among those described above, is also that the peanuts can be place randomly on the board and do not need to be manually pre-sorted or arranged or ordered with respect to color or other quality. Additional embodiments and implementations can incorporate mechanical sorting and further optimizations in automation, including but not limited to shaking the board, having a station with a mounted camera, and robotic instrumentation to collect the samples and process them with minimal human interaction.

Figure 10:
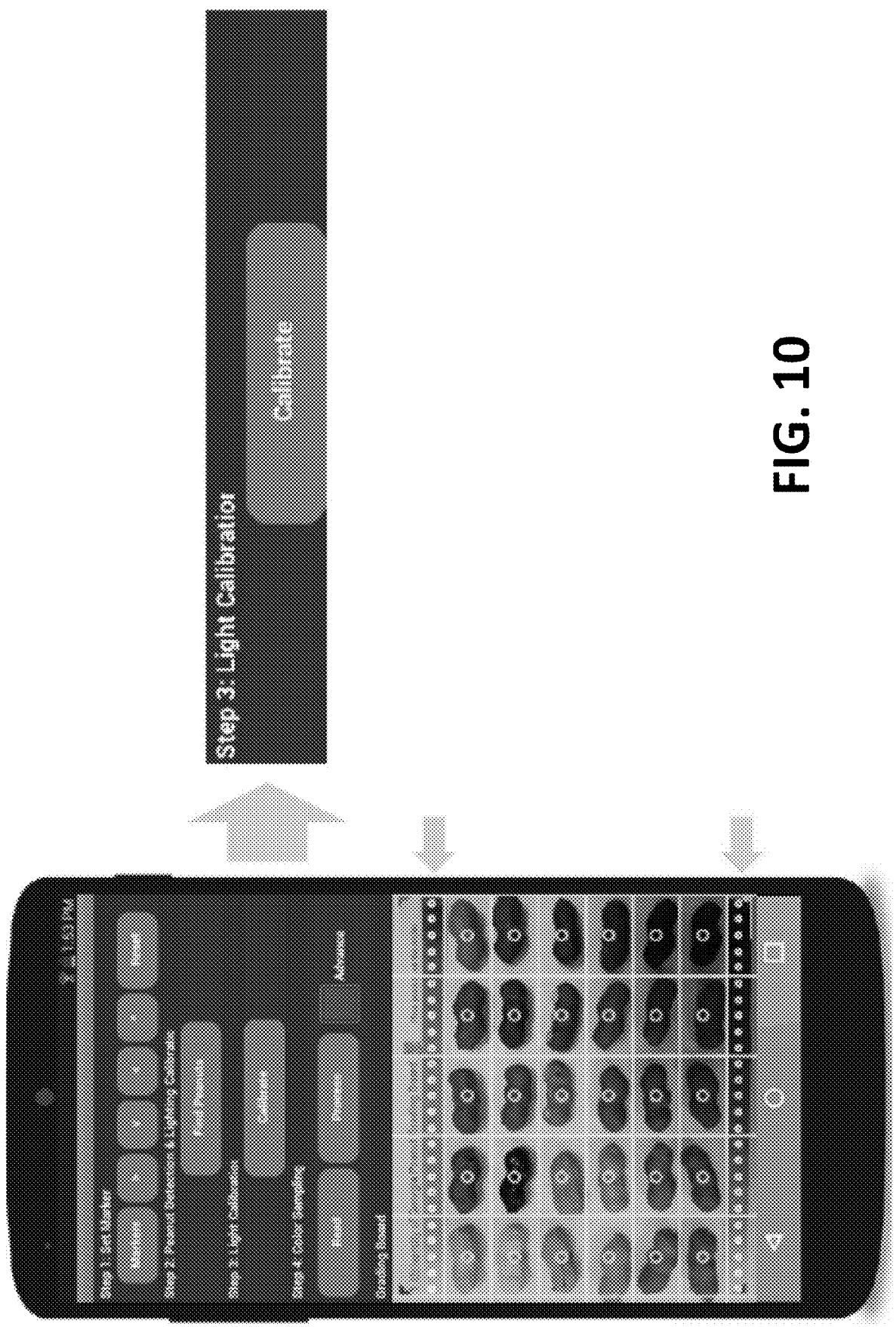
Figure 11:
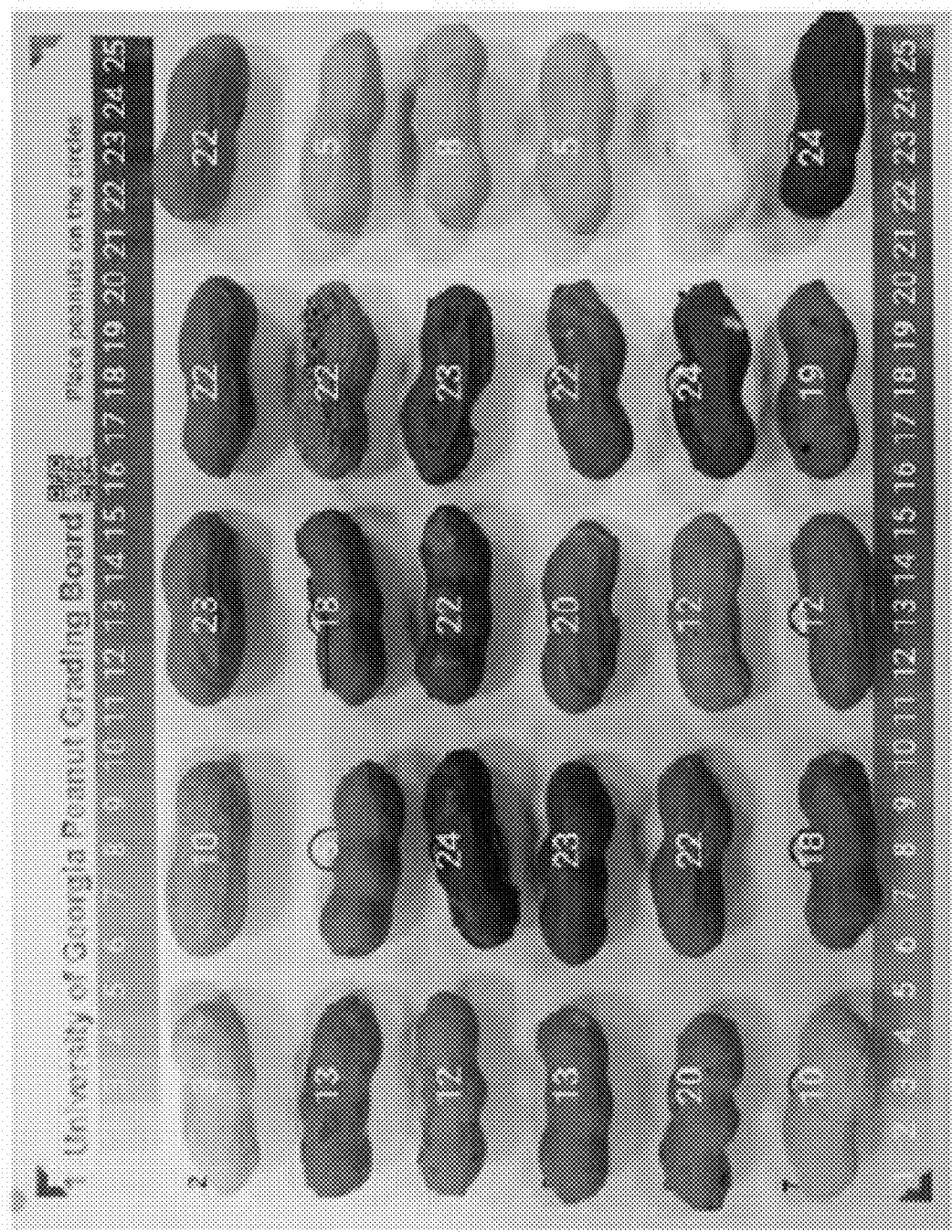
Figure 11:
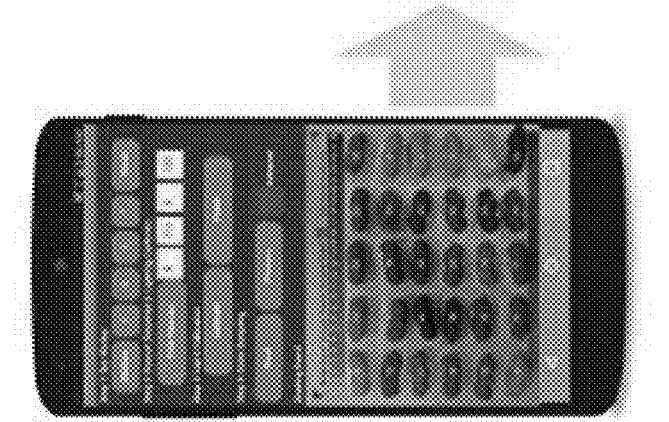

In embodiments, the peanut grading calibration card also includes at least one color gradient calibration bar. In the embodiments illustrated in FIGS. 6A-6B and 7A-7B, the calibration cards each include two color gradient calibration bars on the top and bottom of the cars. The color gradient calibration bar includes a color gradient of colors associated with peanut hulls at different stages of maturity and assists with assigning a color grade to each peanut and to calibrating the image analysis function to minimize lighting effects in the obtained images. The color gradient bar is visible in the embodiments of the calibration cards illustrated in FIGS. 6A-6B and 7A-7B. Application of the color gradient bar to re-calibrate color identification based on lighting effects is illustrated in FIG. 10. Color grading according to the color gradient bar is illustrated in FIG. 11, and the effect of color calibration on the color and maturity analysis is illustrated in FIGS. 13-17. In embodiments, the color gradient calibration bar can be provided separately to the peanut grading calibration card, but can be used with the peanut grading calibration card (e.g., being placed near the peanut card when the picture is taken so that it can also be in the same field of view of the camera, such that both the peanuts on the card and the color gradient calibration bar are in the picture taken by the camera).

Figure 22:
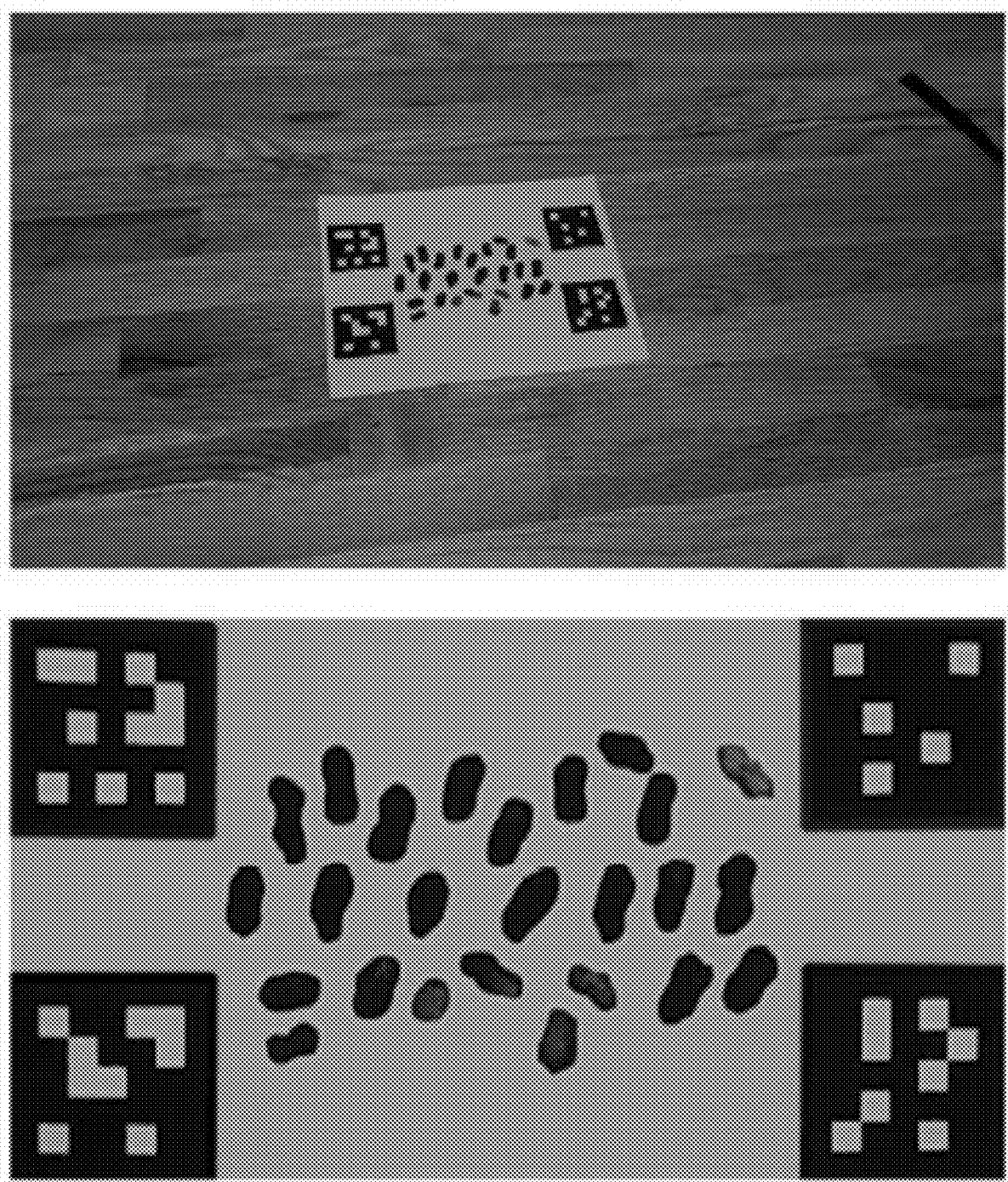
FIG. 22 illustrates an embodiment of a dynamic peanut grading calibration card according to an embodiment of the disclosure, showing a distance image (top) and an automatically cropped/aligned image (bottom). In the figures, the peanuts are represented by black 2D peanut shapes but intended use is for actual sample peanuts to be scattered on the calibration card.

In embodiments, such as illustrated in FIGS. 6A, 6B, 7A, and 7B, the peanut grading calibration card can also include corner or field-of-view markers or indicators, to assist in aligning the field-of view of the camera with the peanut grading calibration card to obtain an image in which the full view of the peanut grading calibration card is captured. In embodiments, the grading calibration card can also include a QR code or other type of matrix barcode for accessing additional peanut information, such as illustrated in FIG. 22. This type of barcode can be scanned for ease of use in communicating to the software various peanut card identity parameters such as size, color, and peanut species/variety, as well as a link to a hosted website containing instructions for use or the developers' contact information.

In other embodiments, the peanut grading calibration card is a dynamic peanut grading calibration card and does not have peanut placement markers, but instead includes 4 corner patches to allow for automatic alignment of the image after capture so that the image can be taken from any angle and cropped automatically in real time. The peanuts can be scattered or randomly placed in the blank area of the dynamic calibration card, such as illustrated in FIG. 22. In embodiments the peanuts can be placed anywhere on the card within the borders of the card, or, in embodiments, within borders established by the 4 corner patches. In embodiments, the color gradient/calibration is embedded within one or more of the 4 corner patches. In embodiments, the calibration is embedded in at least two of the corner patches. Embedding duplicate color calibration in 2-4 of the corner patches can also help compensate for lighting differences that occur across the card. In additional embodiments, the background of the dynamic calibration card may be designed (e.g., color, such as fluorescent green, etc.) to assist with background subtraction. Also, in such embodiments using a dynamic calibration card, the image is cropped automatically, such as illustrated in FIG. 22 and in real time so that the output can be video rather than just a single, static image.

The PMGS also includes one or more cameras in data communication with the one or more computing devices. The camera can be within the computing device (e.g., a mobile computing device, such as, but not limited to a smartphone, tablet, laptop, etc.) or it can be separate/external, but still in data communication with the computing device.

The PMGS computing device is representative of one or more PMGS computing devices that may be in data communication with the remote computing environment as well as the various systems of the PMGS. The PMGS computing device may include, for example, a processor-based system such as embodied in the form of a personal computer (e.g., a desktop computer, a laptop computer, or similar device), a mobile computing device (e.g., personal digital assistants, cellular telephones, smartphones, web pads, tablet computer systems, and similar devices), or other devices with like capability (e.g. NVidia Jetson TX2). The PMGS computing device may include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display may be a component of the computing device or may be connected to the PMGS computing device through a wired or wireless connection.

The PMGS computing device may be configured to execute various applications including peanut maturation determination application (PMDA), a camera, a controller, and/or other applications. The PMDA may be executed to do one or more of the following: receive one or more images from the one or more cameras, detect peanuts from the one or more images, automatically calibrate and adjust for lighting effects using the color gradient calibration bar, analyze the images and independently assign a peanut maturity grade for each of the plurality of peanuts from the one or more images based on at least the type of peanut and the color of the peanut as compared to the color gradient calibration bar, determine optimal dig times for each peanut detected in the one or more images based on the peanut maturity grade, and calculate, based on the optimal dig times of all of the peanuts, an optimal harvest time for a crop of peanuts from which the sample peanuts were taken. In embodiments the PMDA may do one or more of the following: analyze the images, assign, calibrate, determine and calculate data and outcome from the images using a trained deep-learning convolutional neural network (DL-CNN) or similar machine learning techniques (Artificial Intelligence). The DL-CNN may be based on models generated by machine learning using a collection of images. In some embodiments, the PMDA can be configured to interact with one or more remote databases systems that assist in the analysis from the obtained images and additional data.

The PMGS may also include a controller (not shown), which may be embodied as analog, digital, or mixed analog and digital processing circuitry and memory that direct the operation of the electromechanical components of the PMGS. In that sense, the controller can be an example of an embedded real-time control system in which control outputs are produced in response to control input conditions. The controller may be executed to send commands to the various systems of the PMGS (e.g., cameras, etc.). These applications may also be executed to receive and process data from the various systems within the PMGS, the remote computing environment, and/or other entities as can be appreciated. These applications may further be executed to cause the PMGS computing device to share or otherwise transmit the generated peanut grading data with the remote computing environment and/or another computing device or system.

Various data in the PMGS database are accessible to the PMGS computing environment. The PMGS database may be representative of a plurality of data stores as can be appreciated. The data stored in the PMGS database is associated with the operation of the various applications and/or functional entities described below.

Data stored in the PMGS database includes, for example, images, color grading rules, lighting calibration rules, maturity analysis rules, dig date and harvest date rules, and potentially other data and rules. The images can include a collection of images collected by the PMGS and/or images collected by other devices and input to the PMGS. The images can be used by the peanut maturity determination application (PMDA) in the analysis of images of sample peanuts on the peanut grading calibration card that are captured by the cameras for the detection, color assignment, and maturity calculation. The images can be used in retraining and/or refining the machine learning models implemented by the PMGS computing device and/or any other computing device as can be appreciated.

The color grading rules and maturity grading rules include rules and/or configuration data for the various algorithms and/or machine learning models used to detect, grade and analyze peanuts in each captured image. The control rules include rules and/or configuration data used to control the various systems of the PMGS. The control rules further include rules associated with the functioning and operation of the cameras and GPS receiver as well as the sending and receiving of data.

It should be noted that although shown in the PMGS computing device, in some embodiments, the peanut maturity determination application (PMDA) may be executed in the remote computing device, and/or other remote computing device. For example, the PMGS computing device may be configured to transmit the captured images to the remote computing environment and/or any other computing environment that is configured to execute the image analysis application for detecting, grading, and analyzing peanuts from the captured images.

The one or more cameras may be embodied as one or more cameras in the computing device or external to but in data communication with the computing device. Using the camera(s), still images and/or video may be relayed to the PMDA, where it may be analyzed. The images and/or video are relied upon by the PMDA to provide images of peanut color for use in determining the peanut color grading and maturity analysis. The cameras can comprises RGB cameras, multispectral cameras, and/or any other type of camera as can be appreciated.

Figure 3:
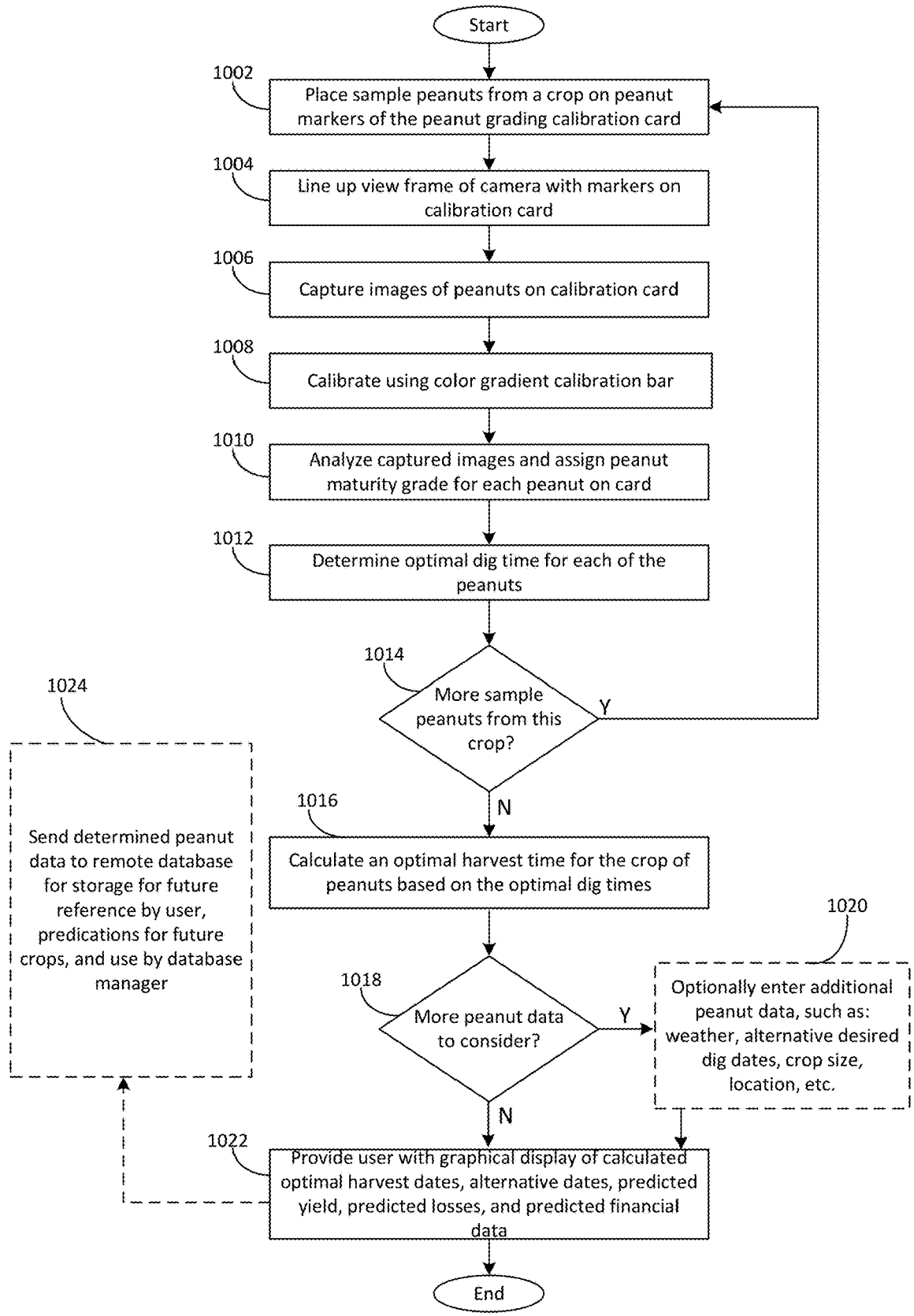
FIG. 3 is a flowchart illustrating one example of functionality implemented as portions of the peanut maturity grading system executed in a computing environment in the networked environment of FIG. 2 according to various embodiments of the present disclosure.

Referring next to FIG. 3, shown is a flowchart that provides an example of a method associated with the operation of the PMGS according to various embodiments. It is understood that the flowchart of FIG. 3 provides merely an example of the many different types of functional arrangements that may be employed to implement the operation of the PMGS as described herein.

At reference numeral 1002, sample peanuts (e.g., from a peanut crop to be harvested) are placed on/in peanut markers of a peanut grading calibration card (or simply on the card if it is an embodiment without markers). The peanuts can be manually placed or it is contemplated in some embodiments, that peanut placement could be automated or semi-automated. At 1004 the view frame of a camera is lined up with markers on the calibration card (this step is optional, one may also just visually line up the field of view). After aligning the camera, the camera is used to capture images of peanuts on the card at reference numeral 1006. After image capture, at reference numeral 1008, the PMDA calibrates the image color identification to minimize lighting effects using the color gradient calibration bar of the peanut grading calibration card. At reference 1010, captured images are analyzed by the PMDA (such analysis can occur before, after, or both before and after lighting/color calibration). During analysis, the PMDA compares/matches peanut color to the color gradient bar and assigns a peanut maturity grade for each peanut in the image. At 1012, the optimal dig time for each peanut is determined based on its maturity grade.

If more peanuts are available from the sample, the process can start over at 1002 for another sample grouping of peanuts. It is contemplated that several peanut grading calibration cards with multiple peanuts could be used for a single crop grading and the data compiled for analysis of the crop as a whole. However, it is also contemplated that analysis of a single crop may not require even all of the space on a single card. Other variations are within the skill in the art. Once all of the data from sample peanuts from a crop is obtained, an optimal harvest time can be calculated (1016) for the crop of peanuts based on the optimal dig times for the sampled peanuts.

As shown in box 1020, additional data can optionally also be considered. Additional data can be entered by a user (e.g., farmer), and may include additional peanut data, weather data, alternative desired dig dates (e.g., a conflict with the optimal dig date requires selection of an alternative harvest date), crop size, location, historical data, etc. Additional data can also be accessed/obtained from a remote database (e.g., historic data or local weather data, etc.). For instance, in embodiments, the PMDA can obtain (automatically or via request) weekly data from the Weekly National Posted Prices for Peanuts released by USDA for pricing, yield and loss analysis (see https://www.fsa.usda.gov/FSA/epasReports?area=home&subject=ecpa&topic=fta-pn; or https://www.fsa.usda.gov/Internet/FSA_EPAS_Reports/peanut090418.pdf). The optional additional data can be considered with the calculated maturity grades, optimal dig times and optimal harvest times to provide a user with a graphical display of calculated optimal harvest dates, alternative dates, predicted yield based on harvest date, predicted profits and loss based on alternative harvest dates, and other projected financial data.

Also, optionally (as shown at reference numeral 1024, determined peanut data and optional additional data can be sent to the remote database for storage for future reference by a particular user or general users or subscribers. Such data can also be used for predictions for future crop yields, best practices, and for use by a database manager for further analysis. This data can be provided to subscribers or other clients to predict market data and other financial data.

Figure 18:
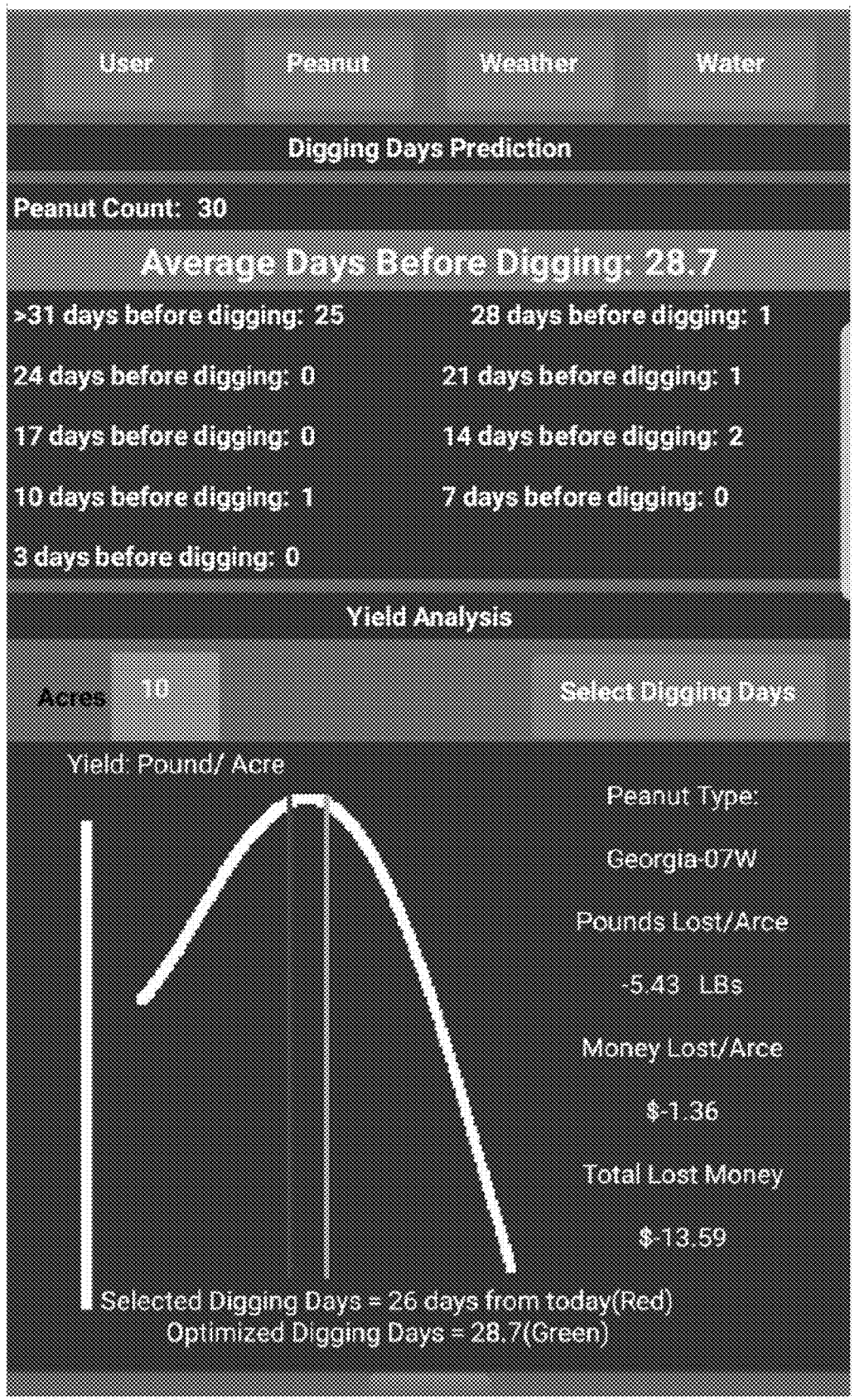
FIG. 18 illustrates pictorial diagrams of example user interfaces rendered by a user computing device in the networked environment of FIG. 2 in which a report is generated showing optimized digging days and additional yield and financial analysis based on the color grading results and showing that the user can also enter additional peanut data such as, peanut type, weather and water conditions.
Figure 19:
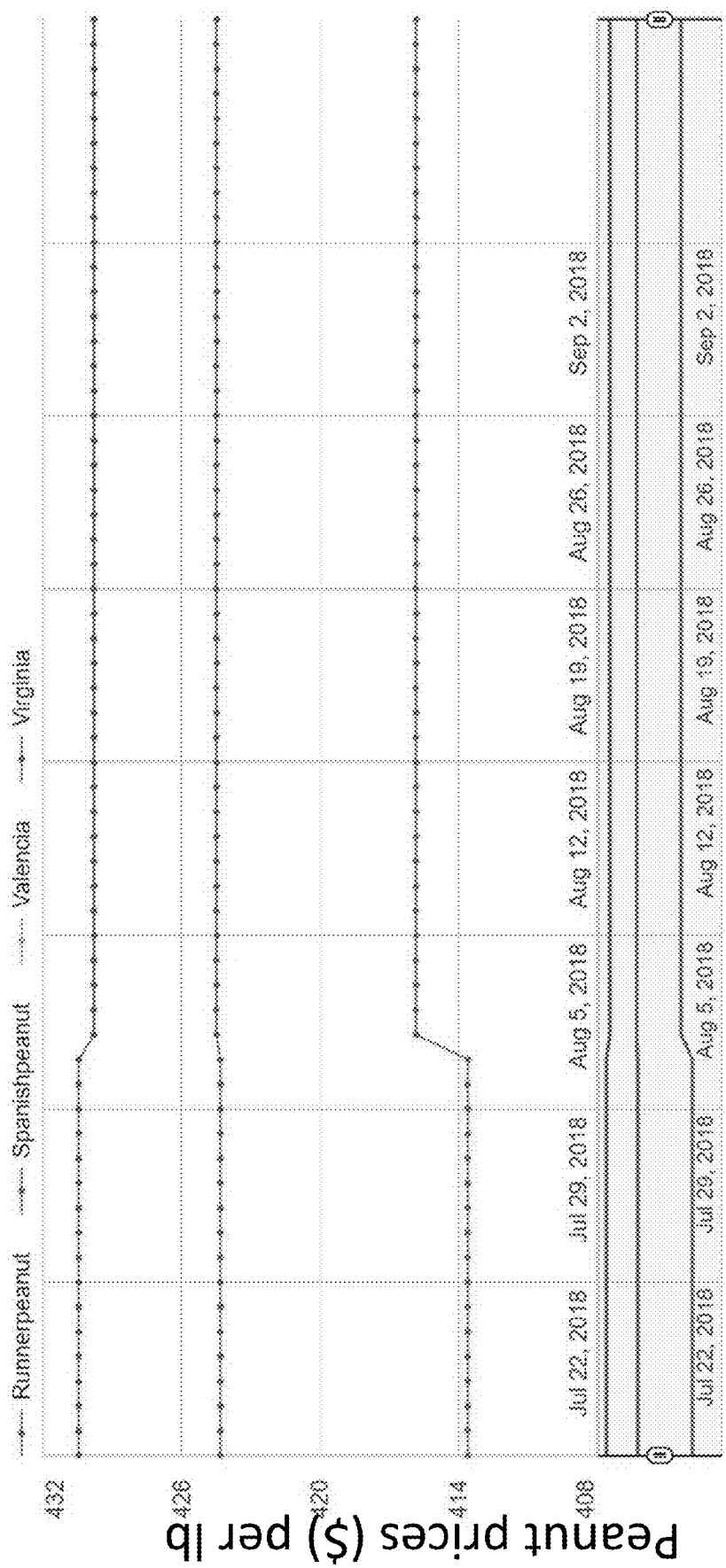
FIG. 19 illustrates a pictorial diagram of example user interface of a dashboard feature rendered by a user computing device in the networked environment of FIG. 2 in which a graphical report is generated that can provide real-time peanut price information.

FIG. 18 provides an example graphical report generated by the PMGS showing calculated optimized digging days for a user based on peanut grading results. As illustrated, the user can also select peanut type, weather and water condition. Based on this combined information, research data can be used to build a relationship between digging days and pounds lost/acre. Then, after the user selects preferred digging days, the PMDA can calculate the total lost revenue for user based on real-time peanut price and acres of peanut crop. This information is shown in a user interface display for user as a reference and can also be uploaded to a dashboard and stored in a remote database to be used for general analysis to generate larger reports on market data.

Figures 20, 21:
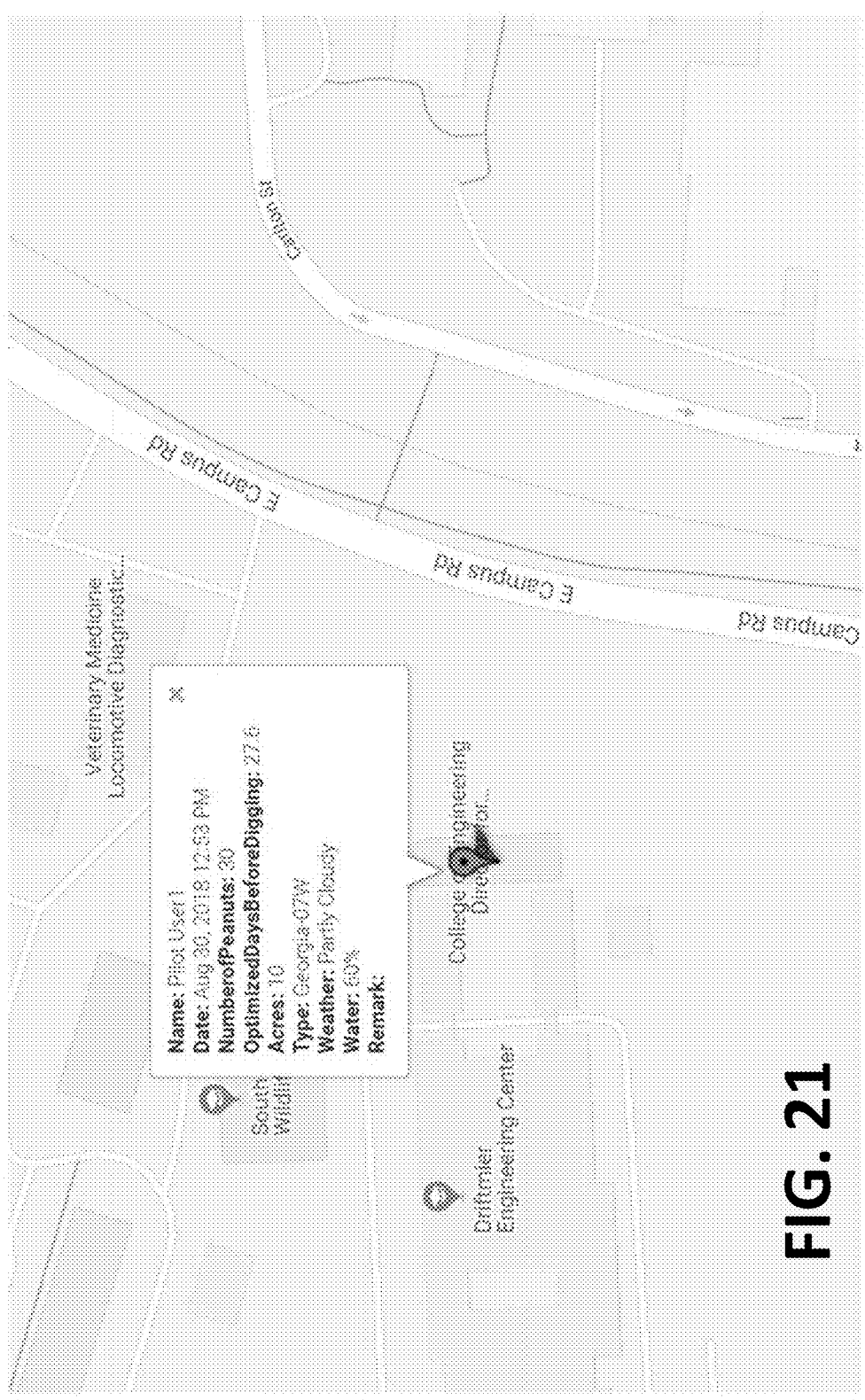
FIG. 20 illustrates a pictorial diagram of example user interfaces of a dashboard rendered by a user computing device in the networked environment of FIG. 2 where a user can input additional peanut data, such as, geographical location, peanut type, weather, and water conditions.
FIG. 21 illustrates a pictorial diagram of example user interfaces of a dashboard interface rendered by a user computing device or remote computing device in the networked environment of FIG. 2 where collected data is shown in a Google map to provide certain users with useful presentation data distribution.

FIG. 1929 illustrates a view of a user interface from a dashboard showing real-time peanut price information for 4 types of peanuts. Users can acquire the price information by checking their app on their computing device or dashboard for the peanuts they breed. FIG. 20 illustrates another view of a user dashboard for entering/collecting information from users such as date, time, specific crop location, number of peanuts used for grading analysis, preferred digging days, optimized digging days, total acres, peanut type, weather, and water conditions. In embodiments, each user has an individual dashboard, and this data can be collected and stored in a remote database to allow further statistical analysis to build prediction models to provide users with information to improve future yield. Additionally, it is envisioned that this data can be used collectively for predicting entire market yield and market price. FIG. 21 illustrates another embodiment of a display of peanut data that provides collected peanut data on a map showing the data in the crop location which can be useful for agencies or researchers to easily access and view peanut data distribution.

Figure 4:
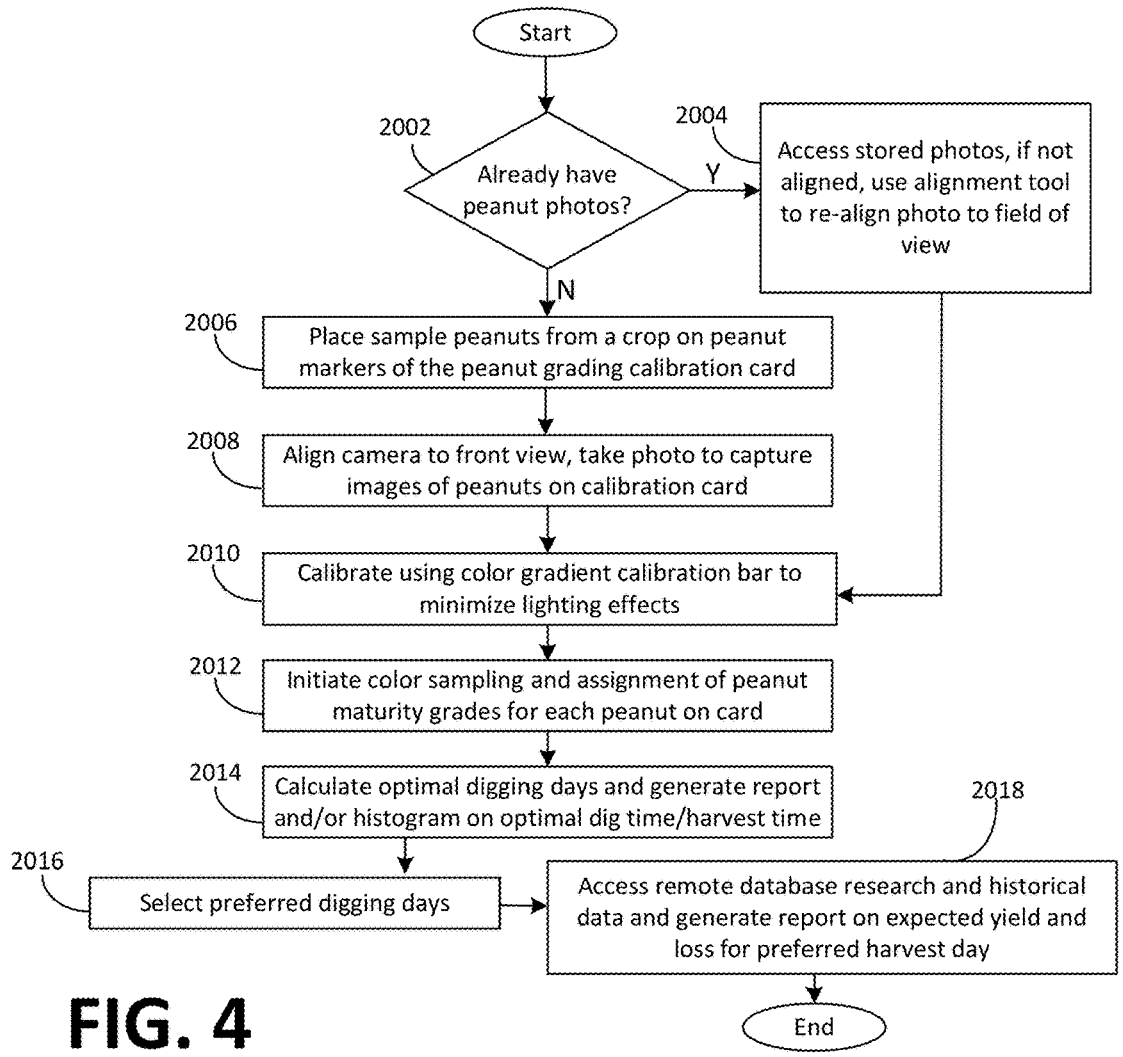
FIG. 4 is a flowchart illustrating one example of a method of determining peanut maturity, optimal harvest days, and projected outcomes using the peanut maturity grading system executed in a computing environment in the networked environment of FIG. 2 according to various embodiments of the present disclosure.
Figure 8:
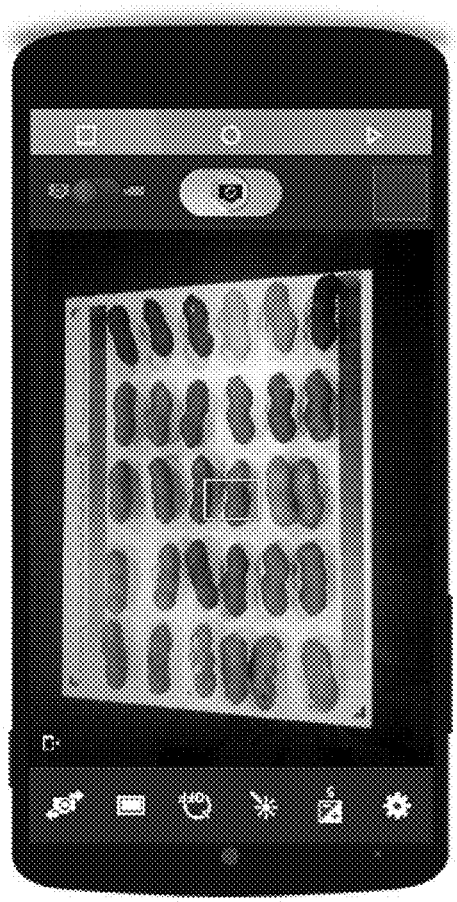
FIGS. 8-12 are pictorial diagrams of example user interfaces rendered by a user computing device in the networked environment of FIG. 2 according to various embodiments of the present disclosure.
Figure 9:
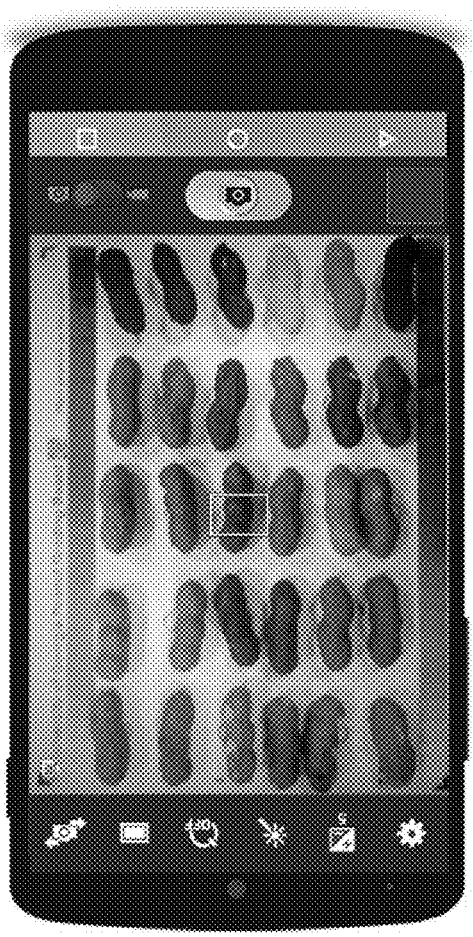
Figure 12:
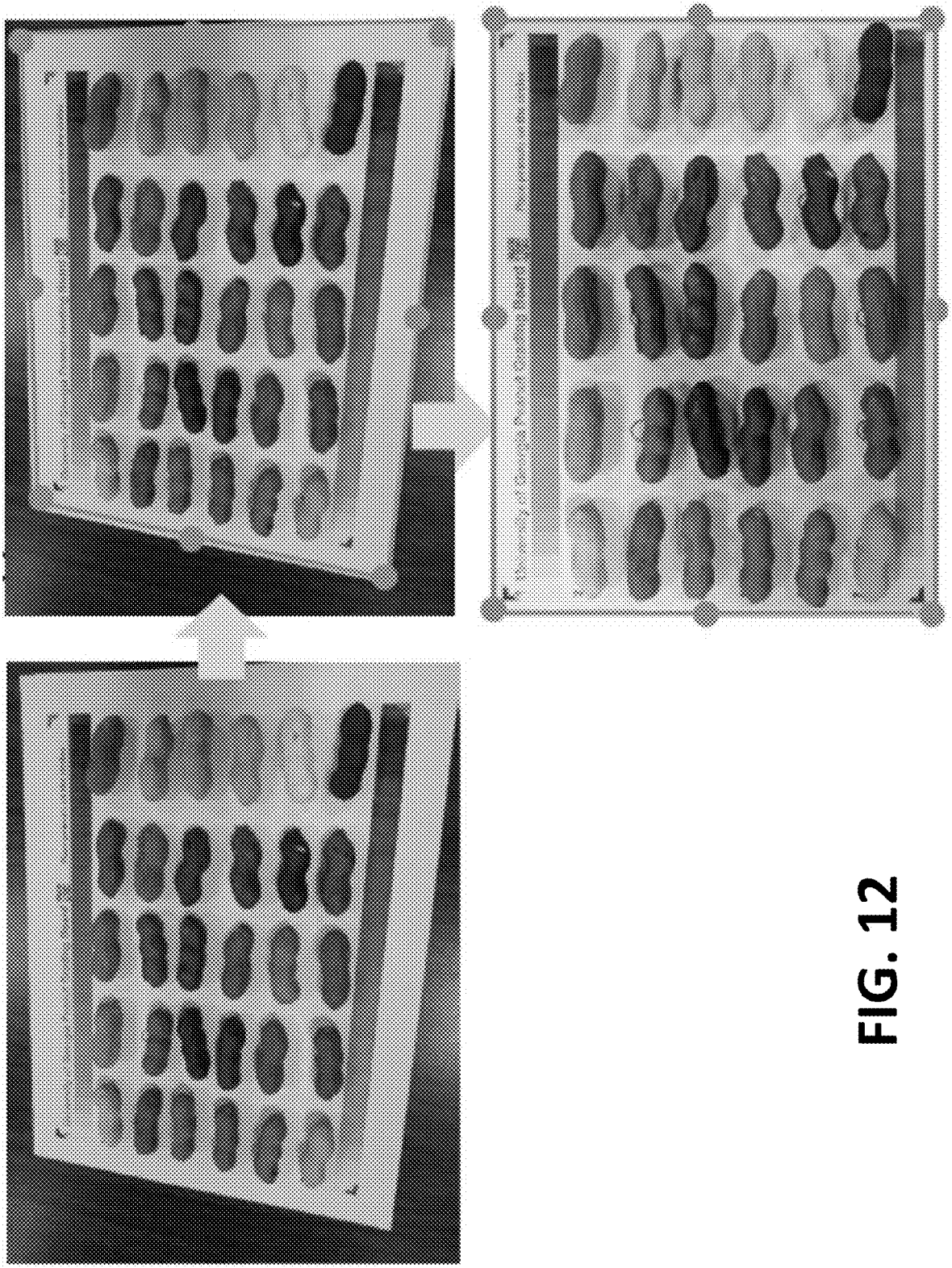
Figure 13:
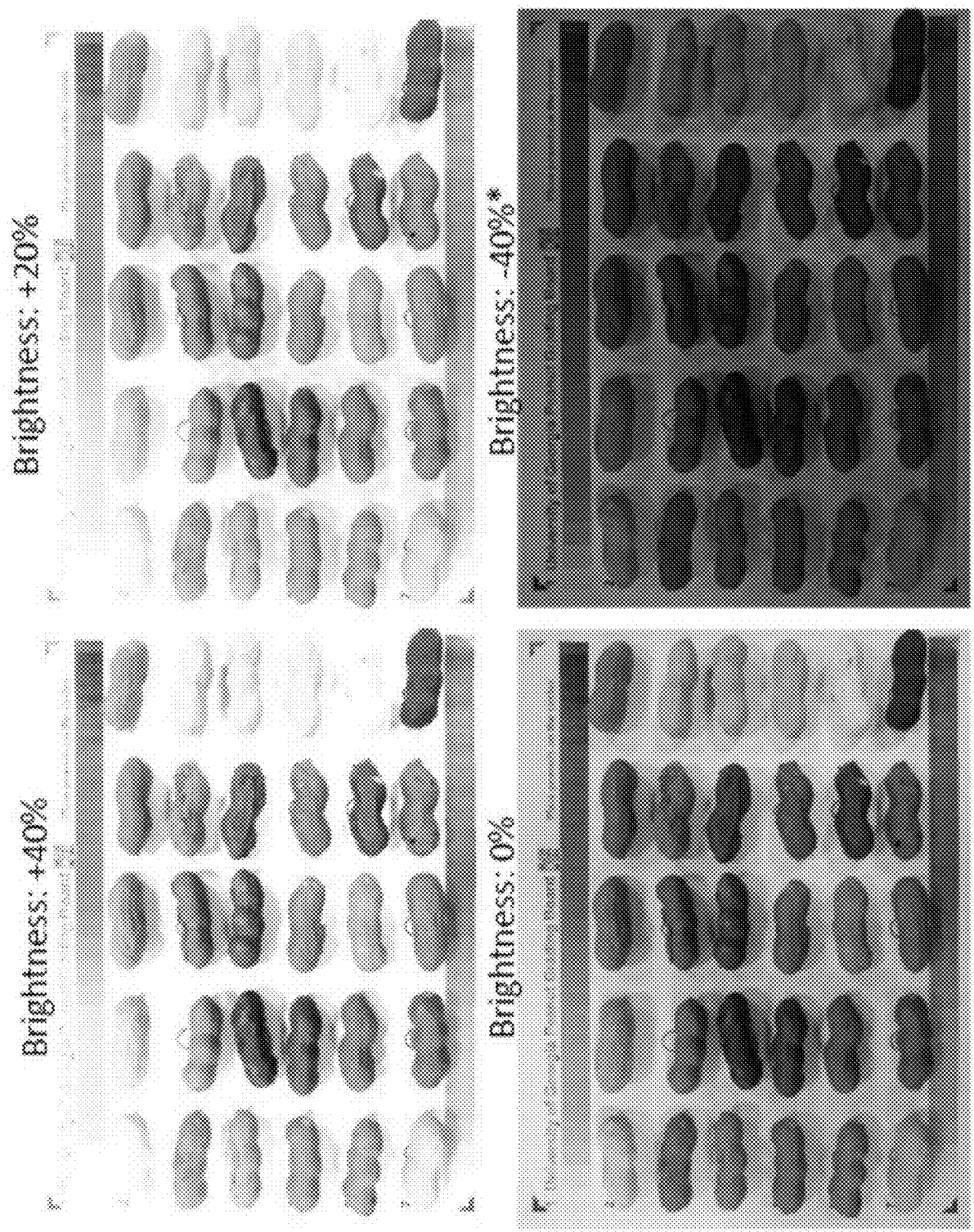
FIGS. 13-17 are images of various user interfaces rendered by a user computing device in the networked environment of FIG. 2 according to various embodiments of the present disclosure where the figures illustrate lighting effects on peanut color grading with and without calibration by the peanut maturation determination application using the color gradient calibration bar.
Figure 14:
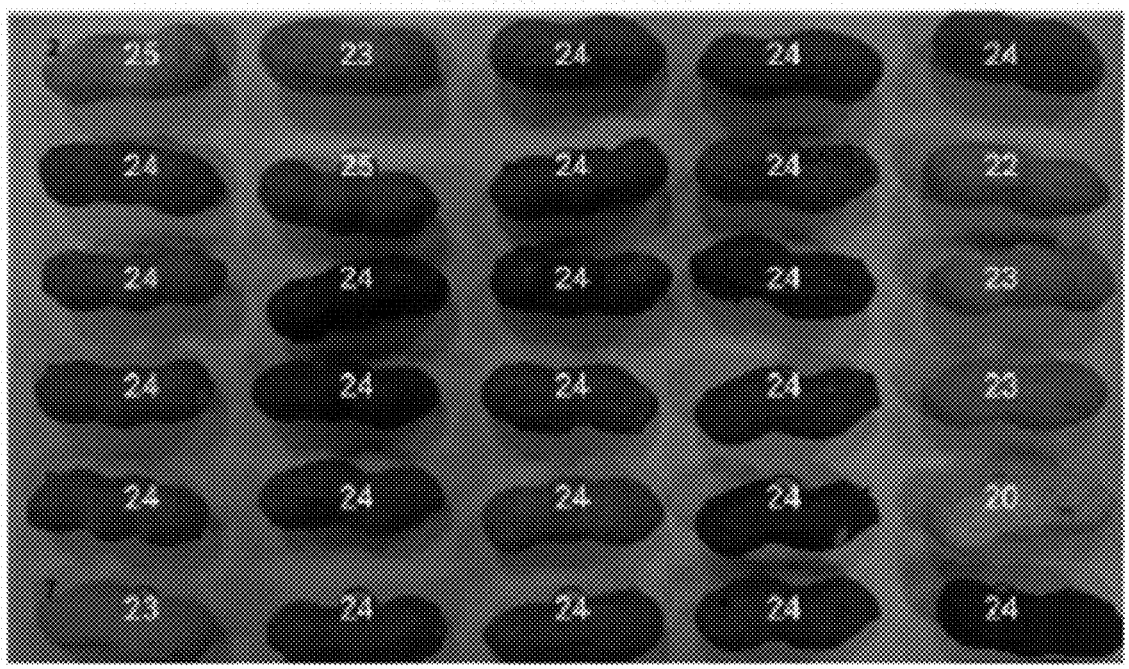
Figure 14:
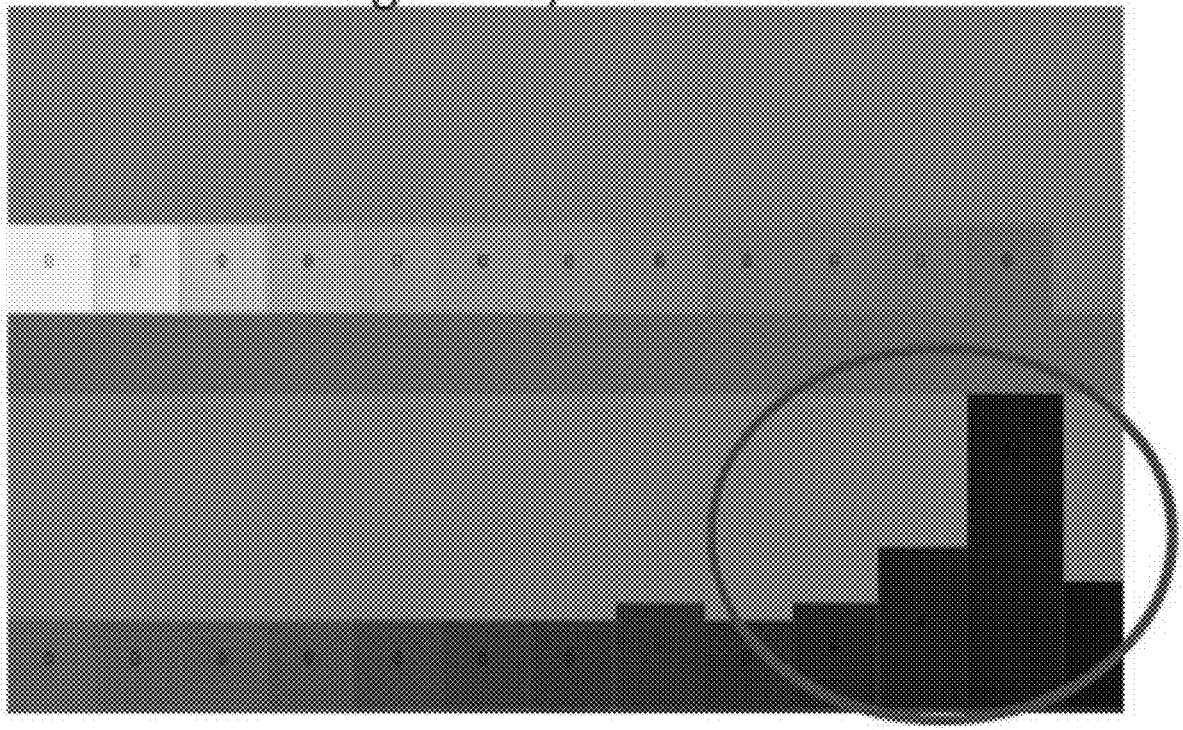
Figure 15:
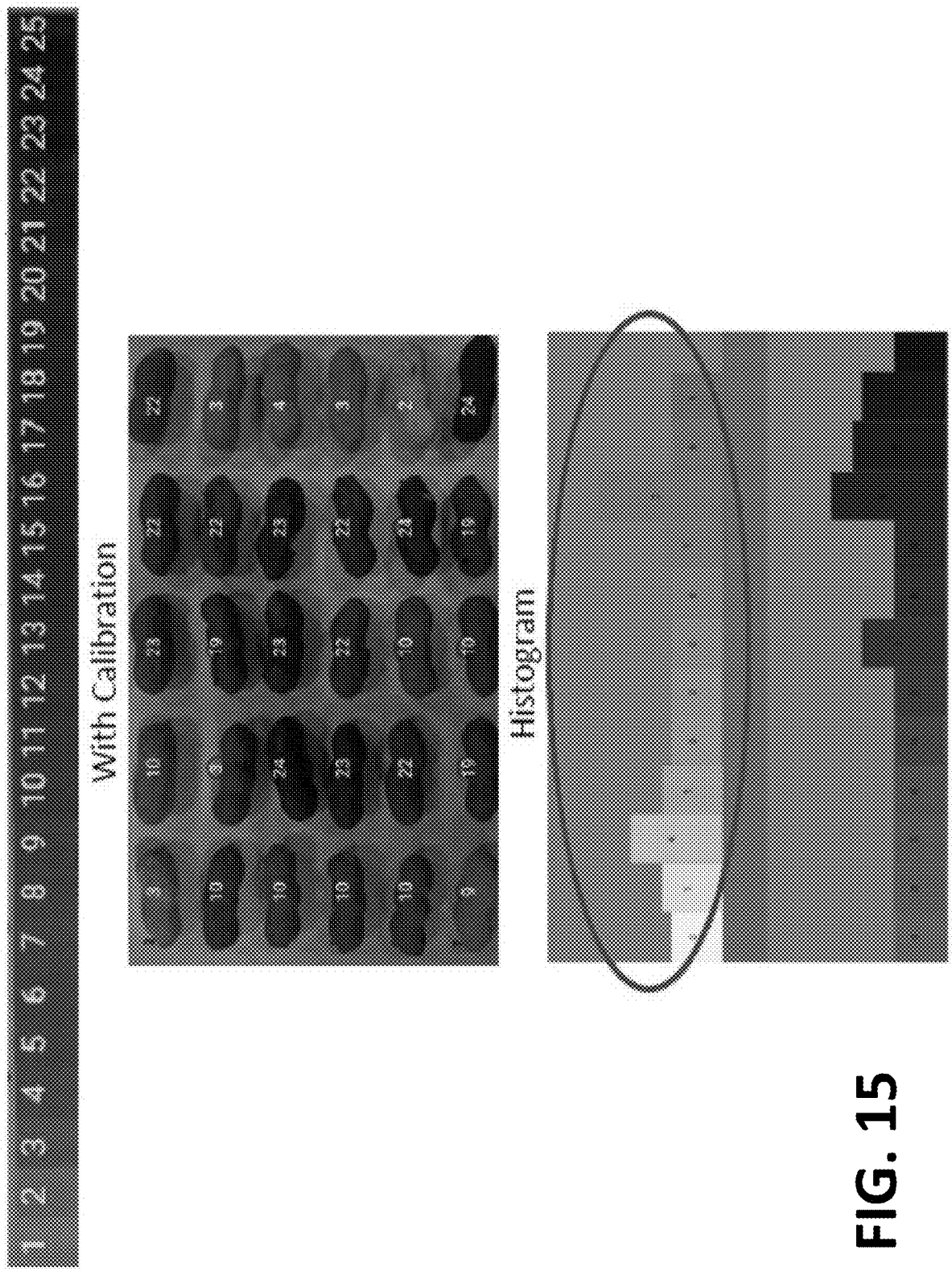
Figure 16:
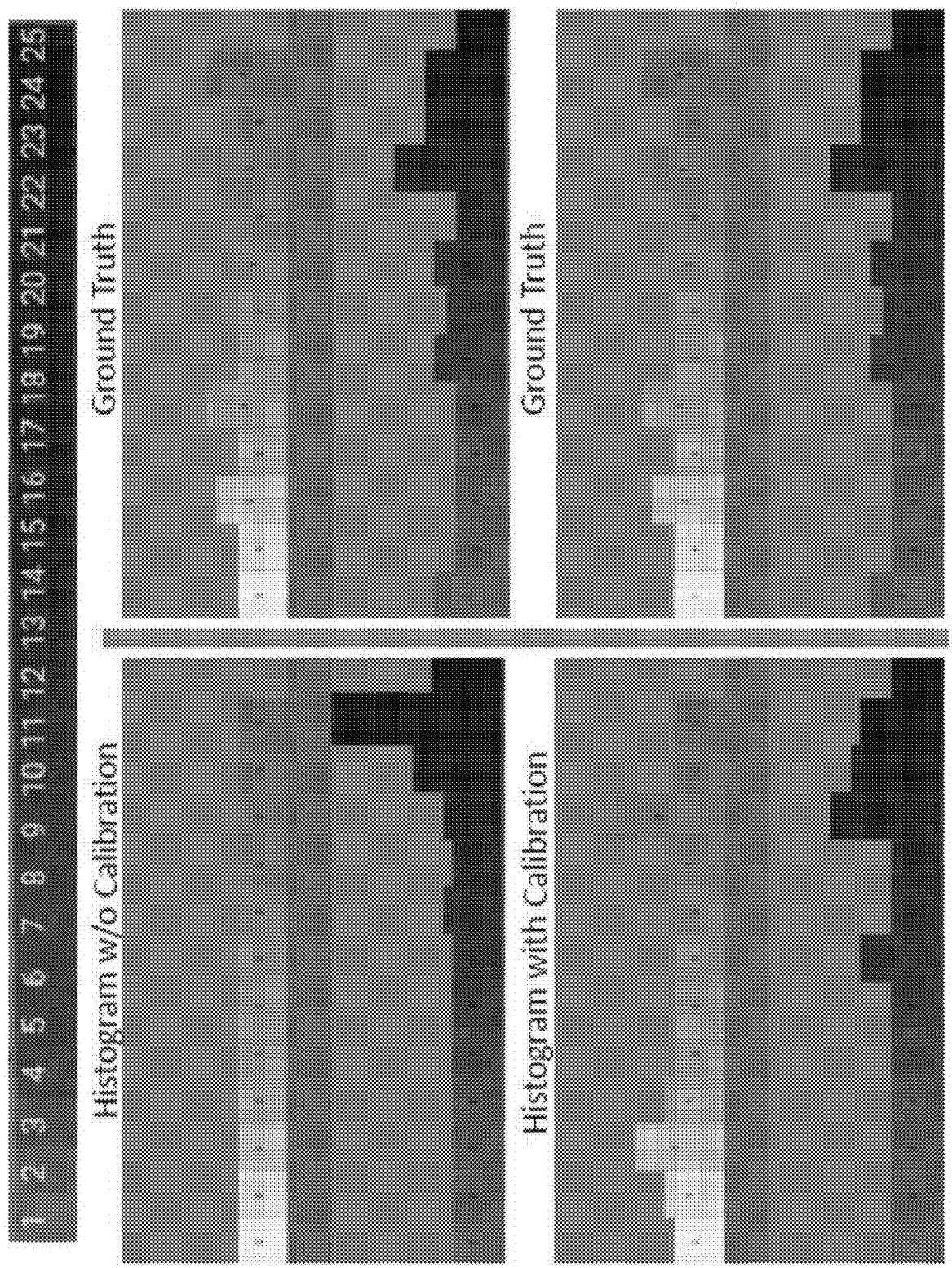
Figure 17:
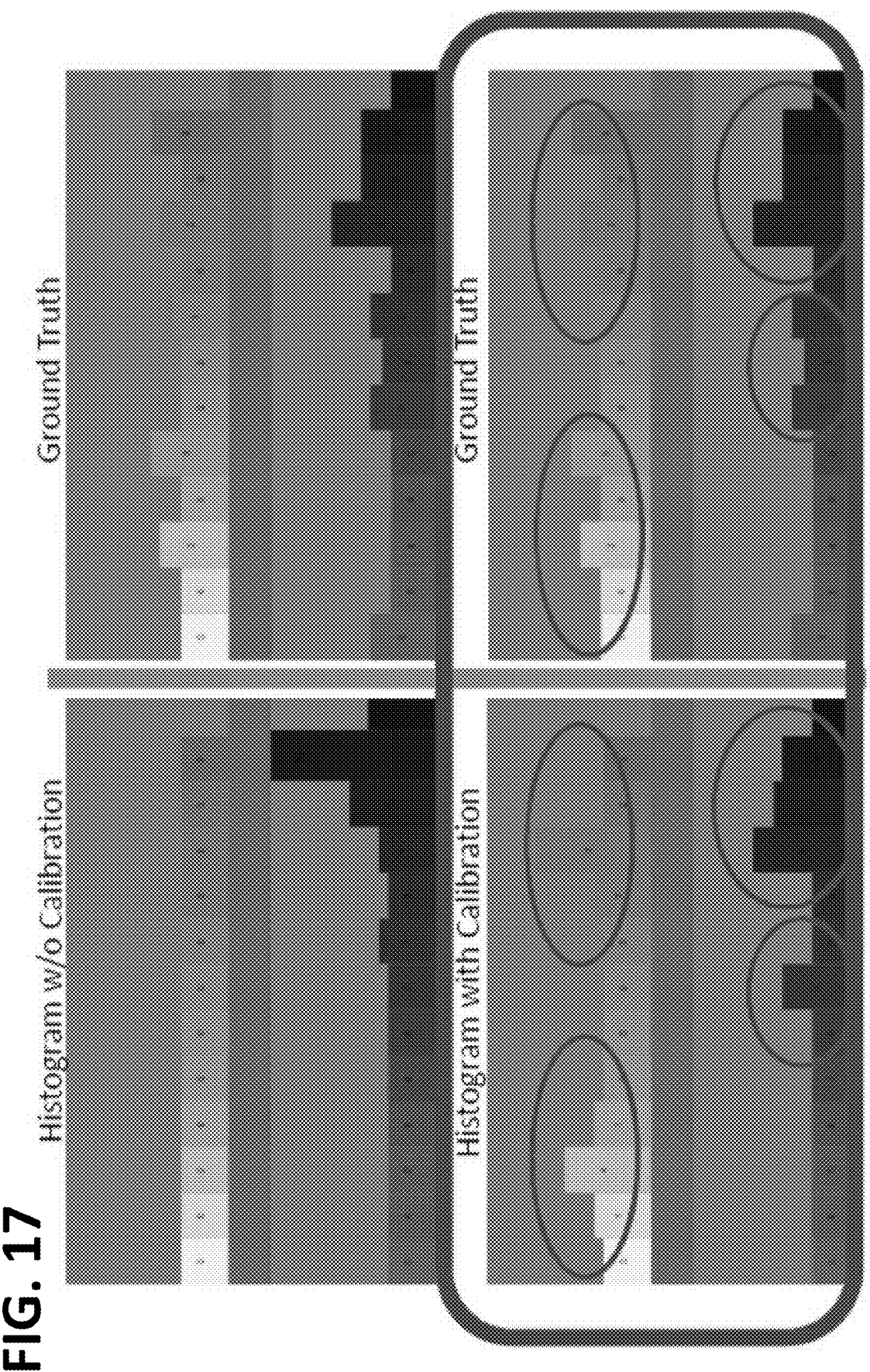

FIG. 4 is another flowchart that provides an embodiment of an example of a method associated with the operation of the PMGS according to various embodiments. At reference numeral 2002, if peanut photos of sample peanuts are already available, stored photos can be accessed at 2004 by the computing device. If the previously obtained images are not well aligned, alignment tools can be used (see, e.g., FIGS. 8, 9, and 12) to re-align photo to a more complete field of view. If photos do not already exist, or if they are insufficient, new photos can be taken of the sample peanuts. In box 2006, sample peanuts from a crop to be analyzed for maturity grading are placed on peanut markers of a peanut grading calibration card. At 2008, the camera is aligned (e.g., front view, landscape orientation is generally preferred, depending on the orientation of the calibration card) and a photo is taken with the camera to capture images of the peanuts on the calibration card. If needed after taking the photo in 2008, if the photo is not aligned well, a user can use the alignment tool (e.g., as set forth in box 2004) to re-align the photo to optimize he field of view. At 2010 the image can be calibrated to minimize lighting effects using the color gradient calibration bar. Then, color sampling is initiated at 2014 to assign peanut maturity grades for each peanut on the card. Based on the maturity grades, optimal digging days are calculated for each peanut and for the crop from which the samples were taken. A report can be generated with graphs, histograms, etc. presenting optimal dig/harvest times. A user can select a preferred digging day at 2016, which may or may not be the same as the determined optimal dig day provided by the PDMA. The PMGS can then access the remote database (box 2018) for research and historical data to generate a detailed report on expected yield and financial data for the preferred harvest day.

Although the flowcharts of FIGS. 3 and 4 illustrate a specific order of execution, it is understood that the order of execution may differ from that which is depicted. For example, the order of execution of two or more blocks may be scrambled relative to the order shown. Also, two or more blocks shown in succession in the flowcharts of FIGS. 3-4 may be executed concurrently or with partial concurrence. Further, in some embodiments, one or more of the blocks shown in FIGS. 3-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Figure 5:
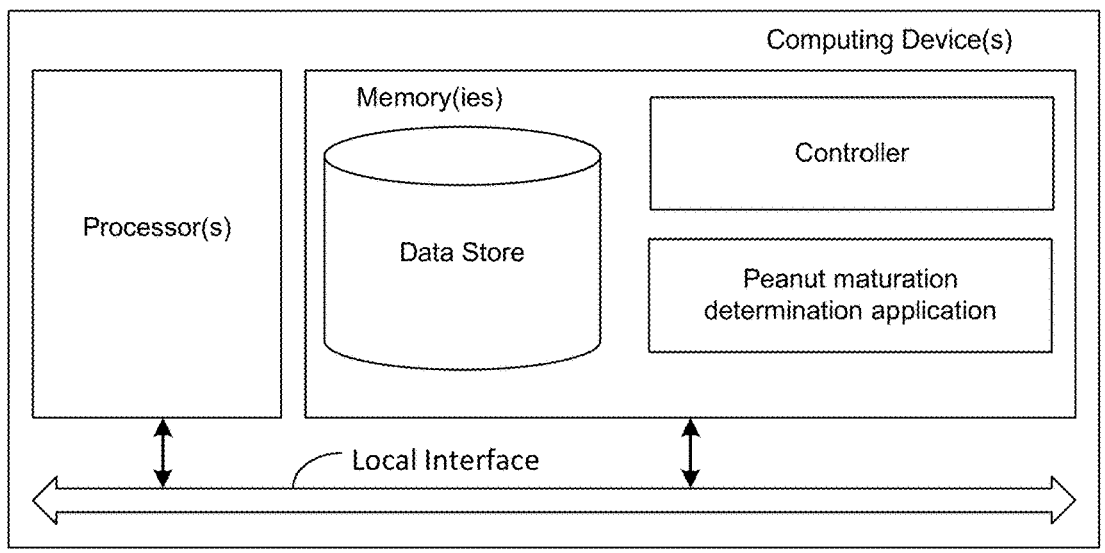
FIG. 5 is a schematic block diagram that provides one example illustration of a computing environment employed in the networked environment of FIG. 2 according to various embodiments of the present disclosure.
Figure 6A:
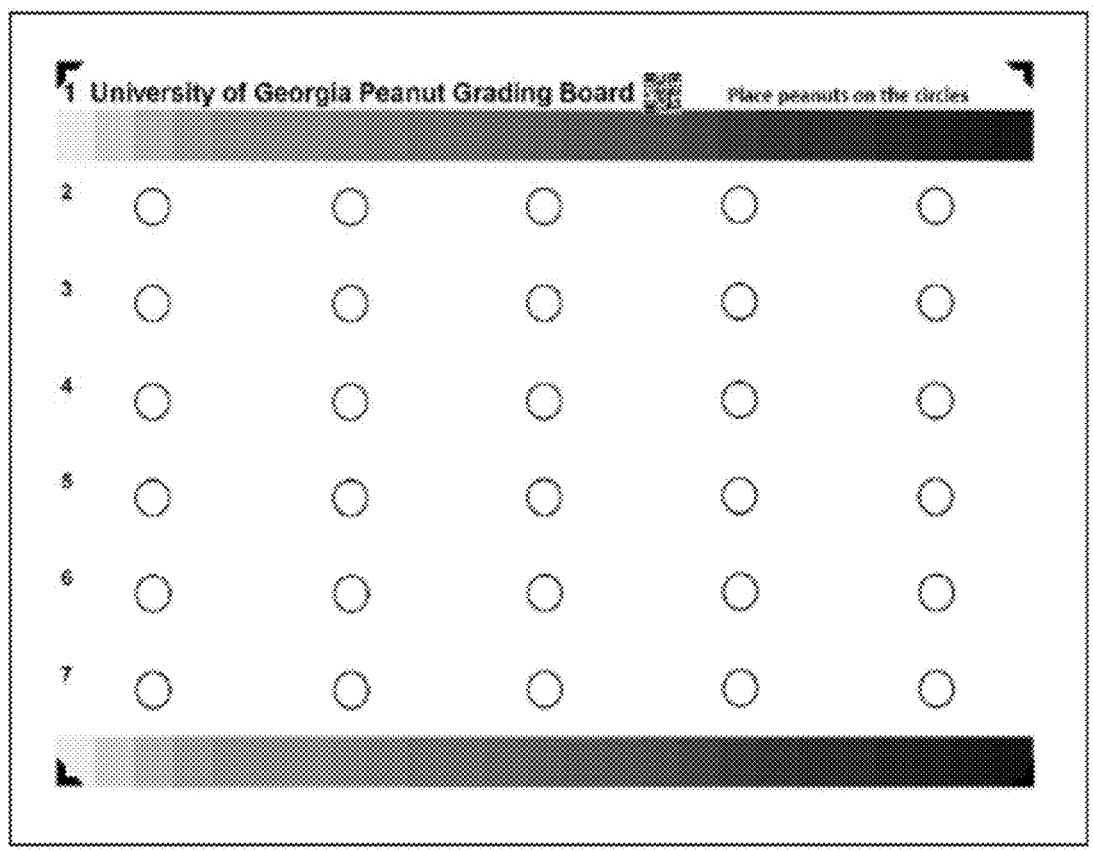
FIGS. 6A-6B illustrate an embodiment of a peanut grading calibration card of the present disclosure with and without peanuts.
Figure 6B:
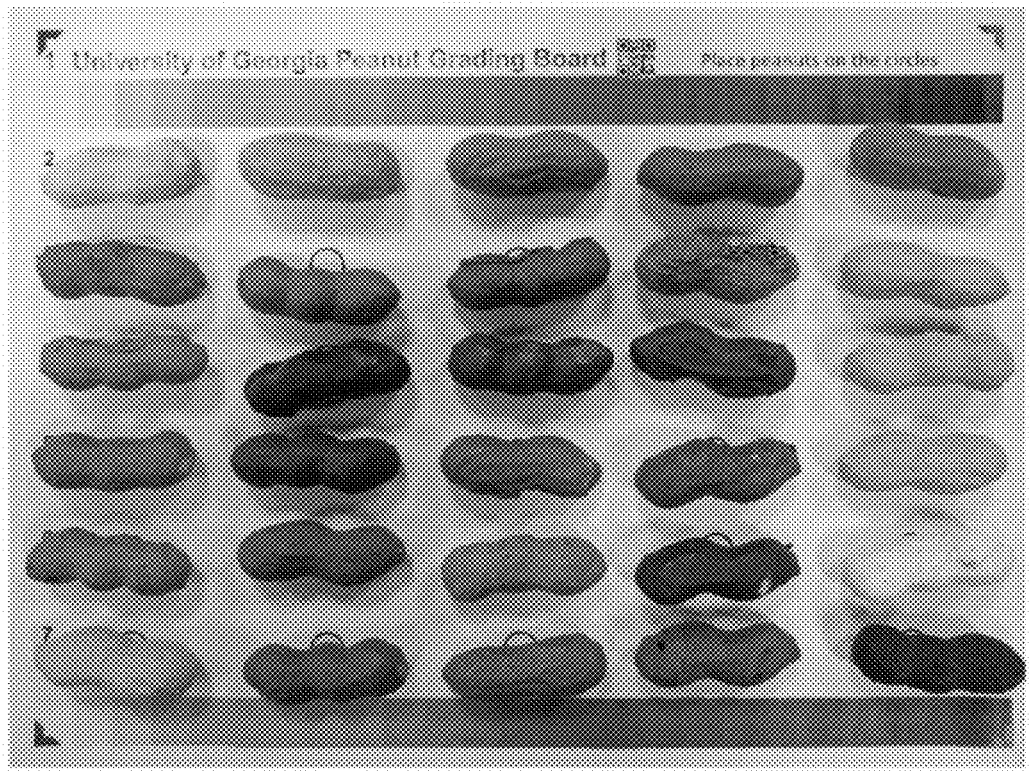

With reference to FIG. 5, shown is a schematic block diagram of the PMGS computing device according to an embodiment of the present disclosure. The PMGS computing environment includes one or more computing devices. Each computing device includes at least one processor circuit, for example, having a processor and a memory, both of which are coupled to a local interface. The local interface may comprise, for example, a data bus with an accompanying address/control bus or other bus structure as can be appreciated.

Stored in the memory are both data and several components that are executable by the processor. In particular, stored in the memory and executable by the processor are the controller, the peanut maturation determination application (PMDA), and potentially other applications. Also stored in the memory may be a PMGS database and other data. In addition, an operating system may be stored in the memory and executable by the processor.

It is understood that there may be other applications that are stored in the memory and are executable by the processor as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, Matlab, or other programming languages.

A number of software components are stored in the memory and are executable by the processor. In this respect, the term "executable" means a program file that is in a form that can ultimately be run by the processor. Examples of executable programs may be a compiled program that can be translated into machine code in a format that can be loaded into a random access portion of the memory and run by the processor, source code that may be expressed in proper format such as object code that is capable of being loaded into a random access portion of the memory and executed by the processor, or source code that may be interpreted by another executable program to generate instructions in a random access portion of the memory to be executed by the processor, etc. An executable program may be stored in any portion or component of the memory including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory is defined herein as including both volatile and nonvolatile memory and data storage components. Volatile components are those that do not retain data values upon loss of power. Nonvolatile components are those that retain data upon a loss of power. Thus, memory may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor may represent multiple processors and/or multiple processor cores, and the memory may represent multiple memories that operate in parallel processing circuits, respectively. In such a case, the local interface may be an appropriate network that facilitates communication between any two of the multiple processors, between any processor and any of the memories, or between any two of the memories, etc. The local interface may comprise additional systems designed to coordinate this communication, including, for example, performing load balancing. The processor may be of electrical or of some other available construction.

Although the controller, image analysis, PMDA and other various systems described herein may be embodied in software or code executed by general purpose hardware as discussed above, as an alternative, the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the PMDA. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Also, any logic or application described herein, including the controller and the image analysis application, that comprises software or code can be embodied in any non-transitory computer-readable medium for use by or in connection with an instruction execution system, such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM), including, for example, static random access memory (SRAM) and dynamic random access memory (DRAM) or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the controller and the image analysis application, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device or in multiple computing devices.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

The invention claimed is:

1. A peanut maturity grading system (PMGS) comprising:
a peanut grading calibration card comprising an array of peanut placement markers and at least one color gradient calibration bar, the peanut grading calibration card configured for placement of a plurality of sample peanuts on the markers of the peanut placement array;
a camera configured to capture one or more images of the peanut grading calibration card;
at least one computing device being in data communication with the camera; and
a peanut maturation determination application (PMDA) executable on the at least one computing device, wherein when executed, the PMDA causes the at least one computing device to at least:
receive the one or more images from the one or more cameras;
detect the plurality of peanuts from the one or more images;
automatically calibrate and adjust for lighting effects using the color gradient calibration bar;
analyze each image of the one or more images and independently assign a peanut maturity grade for each of the plurality of peanuts from the one or more images based on at least a type of peanut and a color of the peanut as compared to the color gradient calibration bar;
determine an optimal dig time for each of the plurality of peanuts in the one or more images based on the peanut maturity grade assigned for each of the plurality of peanuts; and
calculate, based on the optimal dig times for all of the peanuts detected on the peanut grading calibration card, an optimal harvest time for a crop of peanuts from which the sample peanuts were taken.

2. The PMGS of claim 1, wherein the PMDA further causes the at least one computing device to transmit one or more items of peanut data to a remote database, the items of peanut data selected from data from the group consisting of: peanut type, peanut maturity grade, calculated optimal harvest time, actual crop harvest time, crop location, crop water history, crop weather history, predicted crop yield, and actual crop yield.

3. The PMGS of claim 2, wherein the peanut data includes data determined by the PMDA and data entered into the PMDA by a user.

4. The PMGS of claim 1, wherein the PMDA further causes the at least one computing device to generate a report providing optimal harvest dates.

5. The PMGS of claim 4, wherein the report further provides projected crop yield, financial data, or both, based on an optimal harvest date, a preferred harvest date, or both.

6. The PMGS of claim 1, wherein the at least one computing device is a mobile device.

7. The PMGS of claim 6, wherein the at least one computing device is a smartphone.

8. The PMGS of claim 1, wherein the camera is in the at least one computing device.

9. The PMGS of claim 1, wherein the peanut calibration card further comprises field-of-view markers configured to assist in aligning a field-of view of the camera with the peanut grading calibration card.

10. The PMGS of claim 9, wherein the field-of-view markers comprise from 2 to 4 corner markers.

11. The PMGS of claim 1, wherein the peanut grading calibration card is a flat substrate and wherein the array of peanut placement markers comprise a plurality of markings arranged in an array, configured for placement of peanuts over the markings in no particular order.

12. The PMGS of claim 1, wherein the peanut grading calibration card is a three-dimensional substrate, wherein the peanut placement markers comprise a plurality of elongated wells in the substrate arranged in an array and configured for placement of peanuts in the wells in no particular order.

13. A method for grading peanut maturity comprising:
capturing, via a camera system of a peanut maturity grading system (PMGS), one or more images of a plurality of sample peanuts from a peanut crop, the sample peanuts arranged on calibration card comprising an array of peanut placement markers and at least one color gradient calibration bar, wherein the peanuts are arranged on the calibration card such that each peanut is on one of the peanut placement markers;
analyzing, via at least one computing device of the PMGS, the one or more images captured by the camera of the PMGS, wherein the analyzing includes automatically calibrating and adjusting for lighting effects using the color gradient calibration bar, automatically detecting the plurality of peanuts, automatically assign a peanut maturity grade to each peanut based on at least a type of peanut and a color of each peanut as compared to the color gradient calibration bar, and automatically determining an optimal dig time for each peanut based at least on the peanut maturity grade assigned for each peanut; and
generating, via the at least one computing device of the PMGS, a report providing optimized harvest times for the peanut crop based at least on the optimal dig times for the plurality of sample peanuts detected and analyzed.

14. The method of claim 13, further comprising transmitting, via the at least one computing device, one or more items of peanut data to a remote computing device, the items of peanut data selected from the group consisting of: determined optimal harvest times, weather data, crop geographical location data, and peanut crop data from prior years.

15. The method of claim 13, wherein the report further provides one or more projected data items selected from the group of projected data items consisting of:
expected yield for different harvest dates, expected peanut price based on harvest date, and expected profit and loss data based on harvest date.

16. A peanut maturity grading system (PMGS) comprising:
a dynamic peanut grading calibration card comprising four corner alignment and calibration patches, wherein at least two of the four corner alignment and calibration patches comprise embedded color calibration information, the dynamic peanut grading calibration card configured for placement of a plurality of sample peanuts on the card and for dynamic alignment of an image to be captured;
a camera configured to capture one or more images of the peanut grading calibration card;
at least one computing device being in data communication with the camera; and
a peanut maturation determination application (PMDA) executable on the at least one computing device, wherein when executed, the PMDA causes the at least one computing device to at least:
receive the one or more images from the one or more cameras;
automatically align each image of the one or more images in real-time;
detect the plurality of peanuts from the one or more images;
automatically calibrate and adjust for lighting effects using the embedded color calibration information;
analyze each image of the one or more images and independently assign a peanut maturity grade for each of the plurality of peanuts from the one or more images based on at least a type of peanut and a color of the peanut as compared to the color calibration information;
determine an optimal dig time for each of the plurality of peanuts in the one or more images based on the peanut maturity grade assigned for each of the plurality of peanuts; and
calculate, based on the optimal dig times for all of the peanuts detected on the peanut grading calibration card, an optimal harvest time for a crop of peanuts from which the sample peanuts were taken.

17. The PMGS of claim 16, wherein the at least two corner alignment and calibration patches comprising embedded color calibration information comprise QR codes.

18. The PMGS of claim 16, wherein the dynamic peanut grading calibration card comprises borders and does not contain any peanut placement markers and wherein the dynamic peanut grading calibration card is configured for placement of peanuts on the card in any position that is within the borders of the card.

19. A method for grading peanut maturity comprising:
capturing, with a camera of a peanut maturity grading system (PMGS), one or more images of a plurality of sample peanuts from a peanut crop placed on a dynamic peanut grading calibration card, wherein the dynamic peanut grading calibration card comprises four corner alignment and calibration patches, at least two of the four corner alignment and calibration patches comprising embedded color calibration information, the dynamic peanut grading calibration card configured for placement of a plurality of sample peanuts on the card and for dynamic alignment of an image to be captured;
analyzing, via at least one computing device of the PMGS, the one or more images captured by the camera of the PMGS, wherein the analyzing includes calibrating and adjusting for lighting effects using a color gradient calibration bar, detecting the plurality of peanuts, assign a peanut maturity grade to each peanut based on at least a type of peanut and a color of the peanut as compared to the color gradient calibration bar, and determining an optimal dig time for each peanut based at least on the peanut maturity grade assigned for each peanut; and generating, via the at least one computing device of the PMGS, a report providing optimized harvest times for the peanut crop based at least on the optimal dig times for the plurality of sample peanuts detected and analyzed.

20. The method of claim 19, further comprising transmitting, via the at least one computing device, one or more items of peanut data to a remote computing device, the items of peanut data selected from the group consisting of: determined optimal harvest times, weather data, crop geographical location data, and peanut crop data from prior years.

\* \* \* \* \*